United States Patent
Shune et al.

(10) Patent No.: US 12,269,358 B2
(45) Date of Patent: Apr. 8, 2025

(54) VEHICLE TO VEHICLE CHARGING SYSTEM

(71) Applicant: Karma Automotive LLC, Irvine, CA (US)

(72) Inventors: Andrew Shune, Irvine, CA (US); Saleh Ziaeinejad, Irvine, CA (US); Gautham Kannan, Irvine, CA (US); Kaushal Kumar Darokar, Irvine, CA (US)

(73) Assignee: Karma Automotive LLC, Irvine, CA (US)

( * ) Notice: Subject to any disclaimer, the term of this patent is extended or adjusted under 35 U.S.C. 154(b) by 280 days.

(21) Appl. No.: 17/812,886

(22) Filed: Jul. 15, 2022

(65) Prior Publication Data
US 2023/0015182 A1    Jan. 19, 2023

Related U.S. Application Data

(60) Provisional application No. 63/222,531, filed on Jul. 16, 2021.

(51) Int. Cl.
*B60L 53/20* (2019.01)
*B60L 53/18* (2019.01)
(Continued)

(52) U.S. Cl.
CPC ............ *B60L 53/20* (2019.02); *H02J 7/0013* (2013.01); *H02J 7/342* (2020.01); *B60L 53/18* (2019.02);
(Continued)

(58) Field of Classification Search
CPC ...... B60L 53/20; B60L 53/18; B60L 2210/12; B60L 2210/14; B60L 53/14; H02J 7/0013; H02J 7/342; H02J 2207/20; Y02T 10/70
See application file for complete search history.

(56) References Cited

U.S. PATENT DOCUMENTS

2017/0355271 A1* 12/2017 Cronie ................. B60L 53/12
2019/0001833 A1*  1/2019 Coburn ................ B60L 53/66
(Continued)

FOREIGN PATENT DOCUMENTS

JP       2019086842 A    6/2019
KR    20210032107 A    3/2021

OTHER PUBLICATIONS

International Search Report and Written Opinion, relating to application No. PCT/US2022/073796, dated Nov. 8, 2022.
(Continued)

*Primary Examiner* — Peter D Nolan
*Assistant Examiner* — Anwar Mohamed
(74) *Attorney, Agent, or Firm* — Honigman LLP; Grant Griffith; Thomas J. Appledorn

(57) ABSTRACT

A method includes receiving an energy transfer mode input identifying a selected energy transfer mode for the first vehicle, and receiving a total energy request input identifying a value of total requested energy associated with the selected energy transfer mode for the first vehicle. The operations also include receiving a first power transfer limit input including a first power transfer limit value associated with the selected energy transfer mode for the first vehicle, and receiving a second power transfer limit input including a second power transfer limit value associated with the selected energy transfer mode for the first vehicle. The operations also include selecting a power transfer limit from the lesser of the first power transfer limit value and the second power transfer limit value, and initiating a power transfer between the first vehicle and the second vehicle at the selected power transfer limit.

23 Claims, 18 Drawing Sheets

(51) Int. Cl.
  *H02J 7/00*  (2006.01)
  *H02J 7/34*  (2006.01)
(52) U.S. Cl.
  CPC ....... *B60L 2210/12* (2013.01); *B60L 2210/14* (2013.01); *H02J 2207/20* (2020.01)

(56) References Cited

U.S. PATENT DOCUMENTS

| | | | |
|---|---|---|---|
| 2019/0132719 A1* | 5/2019 | Mizutani | B60L 53/36 |
| 2020/0067334 A1* | 2/2020 | Fan | B60L 53/32 |
| 2024/0131946 A1* | 4/2024 | Lim | B60L 53/16 |

OTHER PUBLICATIONS

International Preliminary Report on Patentability for Application No. PCT/US2022/073796 dated Jan. 25, 2024.

* cited by examiner

VEHICLE TO VEHICLE CHARGING SYSTEM

CROSS REFERENCE TO RELATED APPLICATIONS

This application claims priority under 35 U.S.C. § 119(e) to U.S. Provisional Application 63/222,531, filed on Jul. 16, 2021. The disclosure of this prior application is considered part of the disclosure of this application and is hereby incorporated by reference in its entirety.

TECHNICAL FIELD

The present disclosure relates to a vehicle to vehicle charging system for charging an electric vehicle (EV). Specifically, a system utilizing vehicle to vehicle charging for different types of vehicles including EVs.

BACKGROUND

As usage of EVs increase around the world, range anxiety becomes a prominent issue for EV users. Range anxiety is the fear that a vehicle has insufficient range to reach its destination and, as a result, the vehicle's occupants could become stranded. Range anxiety may reduce the demand for EVs and constrain expansion of the EV market. Despite the existence of range anxiety, the vehicle charging infrastructure continues to be aggressively developed. There are many improvements in the field related to increasing the range of electric vehicles through larger batteries and more efficient use of power. However, in the case of emergencies where the main propulsion battery of the EV is fully drained, there are no convenient and accessible emergency solutions that provide charging to the vehicle.

SUMMARY

One aspect of the disclosure provides a computer-implemented method that when executed on data processing hardware of a first vehicle in electrical communication with a second vehicle via an electrical connection causes the data processing hardware to perform operations. The operations include receiving an energy transfer mode input identifying a selected energy transfer mode for the first vehicle, and receiving a total energy request input identifying a value of total requested energy associated with the selected energy transfer mode for the first vehicle. The operations also include receiving a first power transfer limit input including a first power transfer limit value associated with the selected energy transfer mode for the first vehicle, and receiving a second power transfer limit input including a second power transfer limit value associated with the selected energy transfer mode for the first vehicle. The operations also include selecting a power transfer limit from the lesser of the first power transfer limit value and the second power transfer limit value, and initiating a power transfer between the first vehicle and the second vehicle at the selected power transfer limit.

Implementations of the disclosure may include one or more of the following optional features. In some implementations, the operations further include measuring a value of total transferred energy between the first vehicle and the second vehicle, and when the value of total transferred energy is equal to or greater than the value of total requested energy, terminating the power transfer between the first vehicle and the second vehicle. In some examples, the selected energy transfer mode is one of a charge mode or a discharge mode.

In some implementations, the energy transfer mode input is received from a control unit of the first vehicle. In other examples, the energy transfer mode input is received from a control unit of the second vehicle. In some implementations, the total energy request input is received from the first vehicle. Alternatively, the total energy request input is received from the second vehicle.

Another aspect of the disclosure provides a system for transferring energy between a first vehicle and a second vehicle in electrical communication with the first vehicle. The system includes data processing hardware and memory hardware storing instructions that when executed on the data processing hardware cause the data processing hardware to perform operations. The operations include receiving an energy transfer mode input identifying a selected energy transfer mode for the first vehicle, and receiving a total energy request input identifying a value of total requested energy associated with the selected energy transfer mode for the first vehicle. The operations also include receiving a first power transfer limit input including a first power transfer limit value associated with the selected energy transfer mode for the first vehicle, and receiving a second power transfer limit input including a second power transfer limit value associated with the selected energy transfer mode for the first vehicle. The operations also include selecting a power transfer limit from the lesser of the first power transfer limit value and the second power transfer limit value, and initiating a power transfer between the first vehicle and the second vehicle at the selected power transfer limit.

This aspect may include one or more of the following optional features. In some implementations, the operations further include measuring a value of total transferred energy between the first vehicle and the second vehicle, and when the value of total transferred energy is equal to or greater than the value of total requested energy, terminating the power transfer between the first vehicle and the second vehicle. In some examples, the selected energy transfer mode is one of a charge mode or a discharge mode.

In some implementations, the energy transfer mode input is received from a control unit of the first vehicle. In other examples, the energy transfer mode input is received from a control unit of the second vehicle. In some implementations, the total energy request input is received from the first vehicle. Alternatively, the total energy request input is received from the second vehicle.

Another aspect of the disclosure provides a control unit for a first vehicle in electrical communication with a second vehicle. The control unit includes a display, data processing hardware in communication with the display, and memory hardware in communication with the data processing hardware. The memory hardware stores instructions that when executed on the data processing hardware cause the data processing hardware to perform operations. The operations include receiving an energy transfer mode input identifying a selected energy transfer mode for the first vehicle, and receiving a total energy request input identifying a value of total requested energy associated with the selected energy transfer mode for the first vehicle. The operations also include receiving a first power transfer limit input including a first power transfer limit value associated with the selected energy transfer mode for the first vehicle, and receiving a second power transfer limit input including a second power transfer limit value associated with the selected energy transfer mode for the first vehicle. The operations also include selecting a power transfer limit from the lesser of the first power transfer limit value and the second power transfer limit value, and initiating a power transfer between the first vehicle and the second vehicle at the selected power transfer limit.

This aspect may include one or more of the following optional features. In some implementations, the operations further include measuring a value of total transferred energy between the first vehicle and the second vehicle, and when the value of total transferred energy is equal to or greater than the value of total requested energy, terminating the power transfer between the first vehicle and the second vehicle. In some examples, the selected energy transfer mode is one of a charge mode or a discharge mode.

In some implementations, the energy transfer mode input is received from a control unit of the first vehicle. In other examples, the energy transfer mode input is received from a control unit of the second vehicle. In some implementations, the total energy request input is received from the first vehicle.

The details of one or more implementations of the disclosure are set forth in the accompanying drawings and the description below. Other aspects, features, and advantages will be apparent from the description and drawings, and from the claims.

DESCRIPTION OF THE DRAWINGS

The features, aspects, and advantages of the disclosed vehicle-to-vehicle charging will become apparent from the following description, and the accompanying examples shown in the drawings, which are briefly described below.

Like reference symbols in the various drawings indicate like elements.

DETAILED DESCRIPTION

Figure 1:
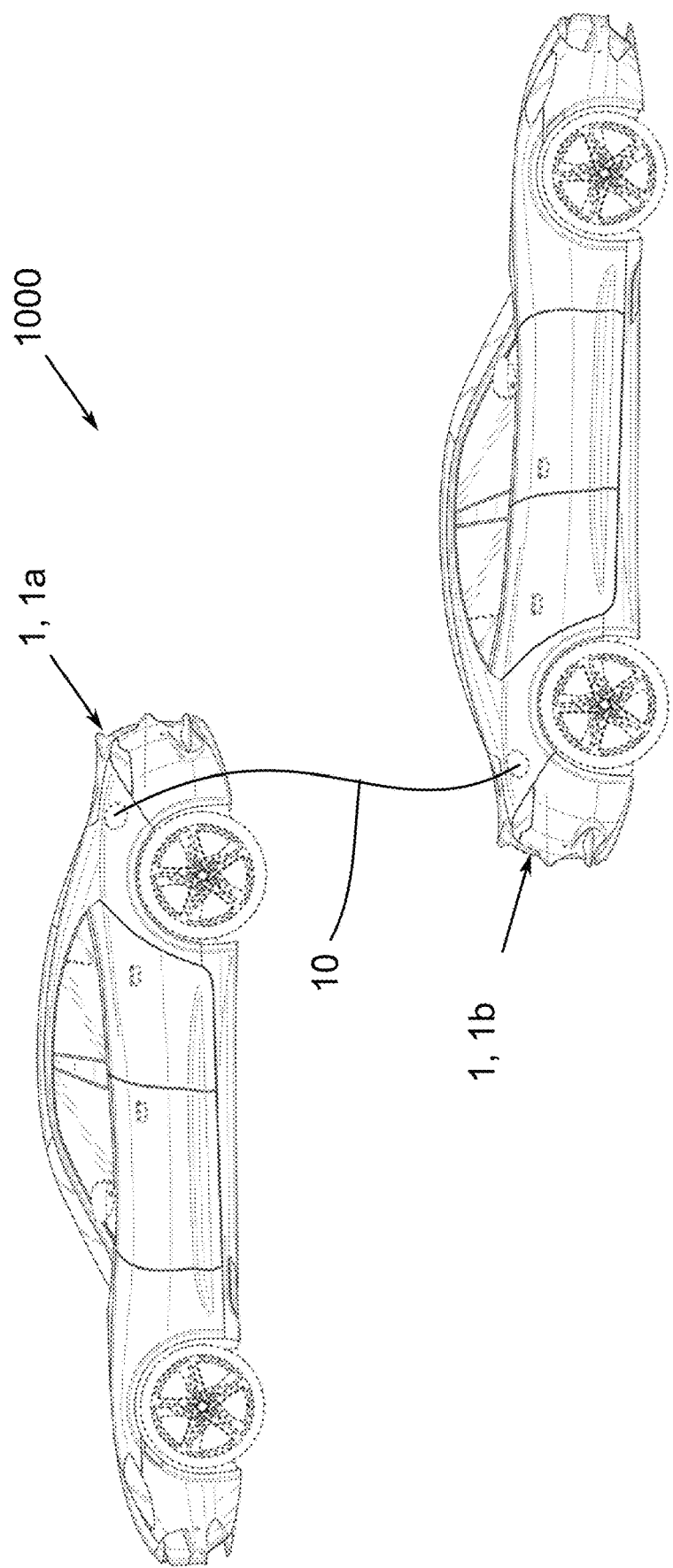
FIG. 1 is an example of a vehicle-to-vehicle charging system for two EVs.
Figure 2:
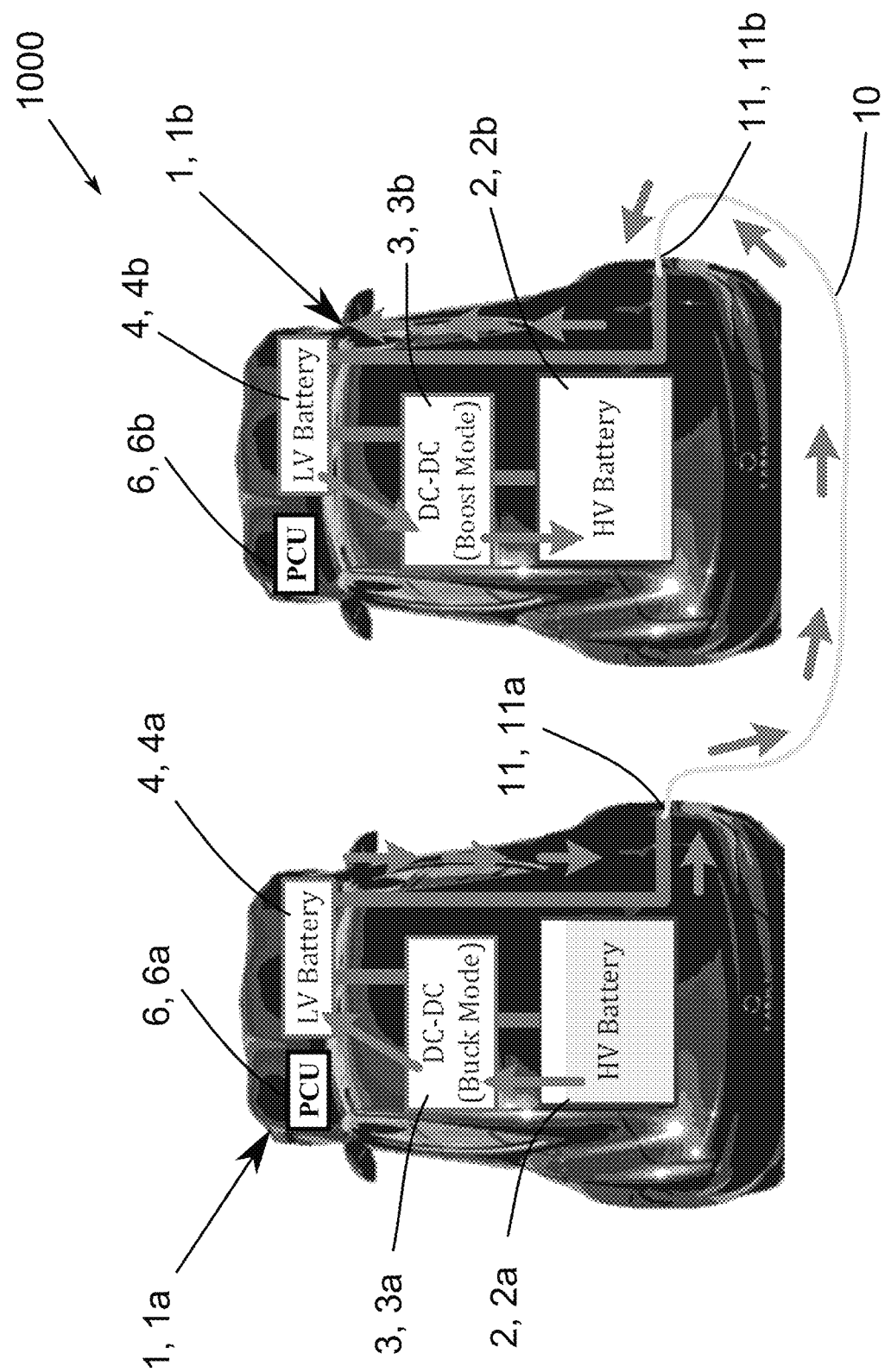
FIG. 2 is a power flow schematic for the charging system shown in FIG. 1.

FIGS. 1 and 2 illustrates a charging system 1000 between two electric vehicles 1, 1a, 1b. Both vehicles 1 include a main propulsive battery 2, 2a, 2b and at least one motor driving the wheels of the vehicle 1. In this example, the first vehicle 1a is the energy-source vehicle with the second vehicle 1b being the energy-receiving vehicle. In this scenario, the energy-receiving vehicle 1b includes a main propulsive battery 2b that may have a low state of charge. The energy-source vehicle 1a is configured to send energy to the energy-receiving vehicle 1b in order to charge the main propulsive battery 2b of the energy-receiving vehicle 1b to a sufficient state of charge to drive to a charging location. In the illustrated example, each of the electric vehicles 1 includes a connection port 11, 11a, 11b configured to interface with a respective connector of a charging cable 10, as discussed in greater detail below.

FIG. 2 shows a power flow schematic of the charging system 1000 shown in FIG. 1. A high-voltage (high-voltage) battery 2a of the energy-source vehicle 1a sends energy to a DC-DC converter 3, 3a, which lowers the voltage levels (Buck Mode) in order for the energy to be transferred to the low-voltage (low-voltage) battery 4, 4a. From the low voltage battery 4, 4a of the energy-source vehicle 1a, the energy travels through cable 10 to a low-voltage battery 4, 4b of the energy-receiving vehicle 1b. A DC-DC converter 3, 3b of the energy-receiving vehicle 1b then converts the voltage back into the high-voltage battery voltage (Boost Mode) in order to charge the high-voltage battery 2b of the energy-receiving vehicle 1b.

Figure 3:
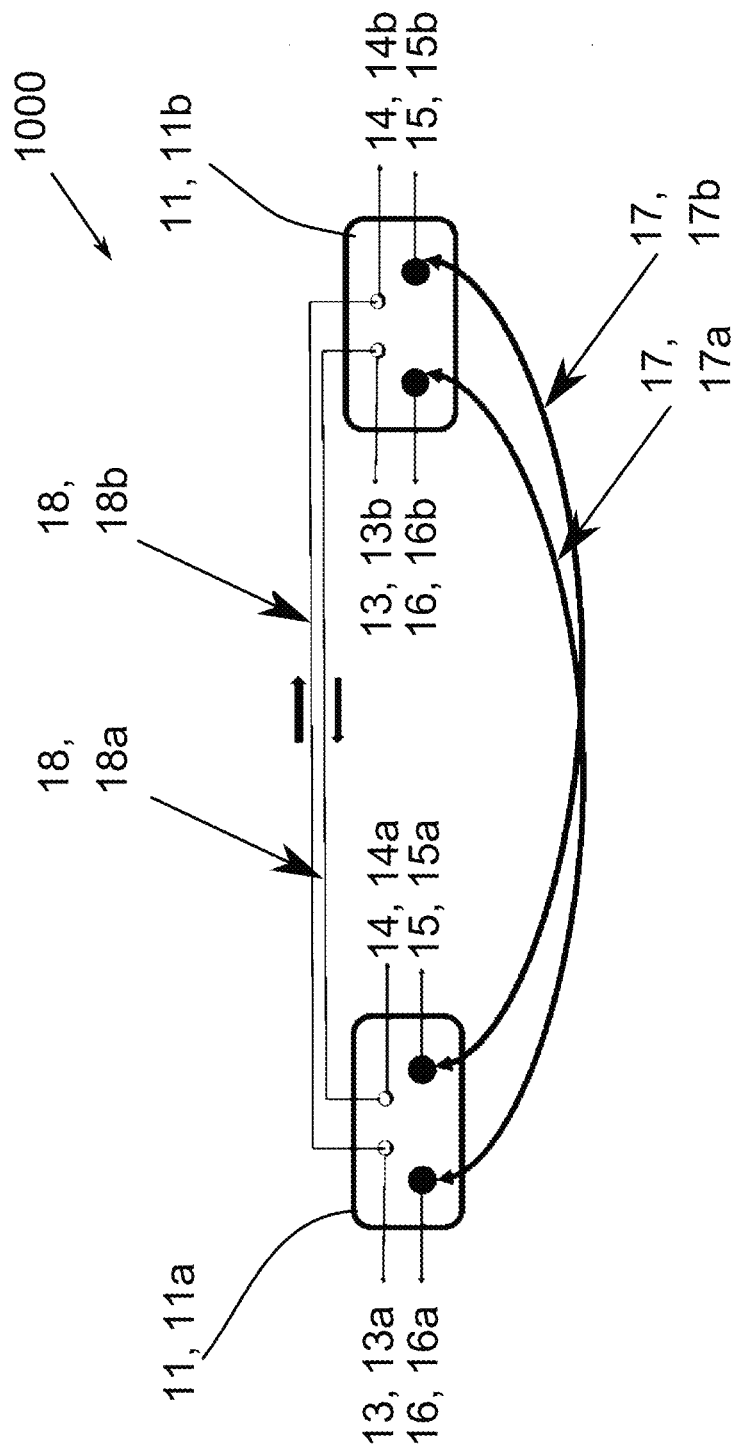
FIG. 3 is a connection schematic of the charging system shown in FIG. 1.

FIG. 3 is a connection schematic of the charging system 1000 shown in FIGS. 1 and 2. As shown, each of the connection ports 11 may include one or more terminals 13, 14, 15, 16. In the illustrated example, a first connection port 11, 11a of the energy-source vehicle 1a includes a first plurality of terminals 13a, 14a, 15a, 16a and a second connection port 11, 11b of the energy receiving source vehicle 2 includes a second plurality of the terminals 13b, 14b, 15b, 16b. Each connection port 11 includes a communications output 13, a communications input 14, a power terminal 15, and a ground terminal 16. The terminals 13, 14, 15, 16 are configured to be female sockets but can also be configured as male terminals. The communications output 13 and the communication input 14 provide an interface for the two vehicles 1a, 1b to electrically communicate to each other. The communications input 14a of the energy-source vehicle 1a is connected to the communications output 13b of the energy-receiving vehicle 1b and the communications output 13b of the energy-source vehicle 1a is connected to the communications input 14b of the energy-receiving vehicle 1b. In some examples, communication signals transferred by each of the communications terminals are pulse width modulated (PWM) signals.

The cable 10 is configured to connect energy-source vehicle 1a to energy-receiving vehicle 1b. The cable 10 is configured to attach to the four terminals and can be male or female connectors depending on the terminals. In the illustrated example, the cable 10 includes a pair of power transfer lines 17, 17a, 17b and a pair of communication lines 18, 18a, 18*b* each configured to connect corresponding pairs of the terminals 13, 14, 15, 16 of the two vehicles 1*a*, 1*b*.

Figure 4:
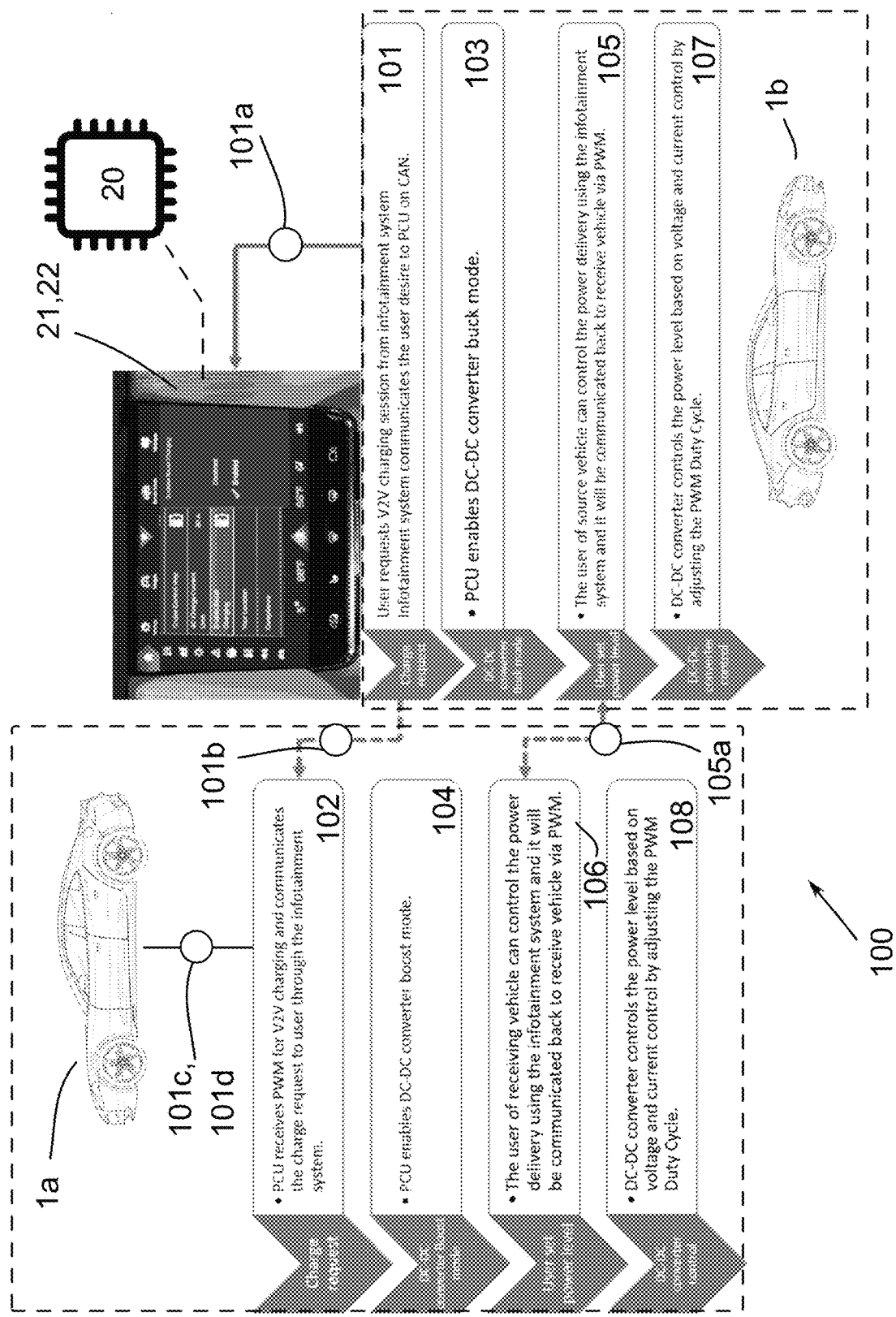
FIG. 4 is a simplified flow chart of the charging system shown in FIG. 1.

FIG. 4 shows a power control scheme 100 that the electric vehicles 1*a*, 1*b* execute when performing the EV to EV charging using the system 1000. Both the source vehicle 1*a* and the receiving vehicle 1*b* include a power control unit configured to send commands to the DC-DC converter 3, which performs voltage control with regulated current. Generally, the PCU (also referred to as data processing hardware) executes instructions stored on memory hardware of the vehicle that cause the PCU to execute the power control scheme 300 to protect the powertrain of both vehicles 1. Both vehicles 1 include a user device 20 including a user interface 21 displayed on a display 22 where the users of the vehicle 1 can control the power transfer between vehicles 1. The user device 20 may correspond to a vehicle infotainment system that includes a screen/display 22 for displaying the user interface 21. The user interface 21 may include a graphical user interface that accepts user input via at least one of touch, gesture, eye gaze, or speech. In some examples, the user device 20 includes a mobile computing device that pairs with the vehicle infotainment system such as a smart phone, tablet, laptop computer, smart watch, smart glasses, etc. that communicates with the vehicle PCU via a computer aided network (CAN). The user device (e.g., control unit) may execute an application to perform the vehicle to vehicle charging functionality disclosed herein. In the illustrated example, the control unit 20 and user interface 21 are implemented as an infotainment system 20 integrated within the vehicle 1. However, the user interface 21 may be provided on a remote user device (e.g., mobile computing device) connected/paired to the vehicle 1 via a communication network, a wired connection (e.g., USB), or a wireless (e.g., Bluetooth, Wi-Fi) connection. Functionality of the vehicle to vehicle charging system may also, in whole or in part, execute on a remote server (e.g., cloud) in communication with the vehicle(s) 1.

At step 101, the system 1000 receives a charge request input 101*a* from a user of one of the vehicles 1 via the user interface 21 of the user device 20. For the sake of illustration, FIG. 4 shows the charge request input being provided via the user interface 21 of the source vehicle 1*a*. However, a user may also initiate the charge request input via the user interface 21 of the receiving vehicle 1*a* when the two vehicles 1*a*, 1*b* are connected via the cable 10. Upon receipt of the charge request input 101*a*, the PCU of the source vehicle 1*a* transmits a charge request 101*b* to the receiving vehicle 1*b* via the communication output 13*a* of the source vehicle 1*a* and the communication input 14*a* of the receiving vehicle 1*b*. In the present example, the source vehicle 1*a* transmits the charge request 101*b* to the receiving vehicle 1*b* through the interface unit of the source vehicle 1*a*.

At step 102, the PCU of the receiving vehicle 1*b* receives the charge request 101*b* from the source vehicle 1*a* and displays the charge request 101*b* as a charge request prompt 101*c* on the user interface 21 associated with the source vehicle 1*b*. An operator of the source vehicle 1*b* may view the charge request prompt 101*c* and provide a charge request response 101*d* (e.g., accept, decline) via the user interface 21. Optionally, the charge request prompt 101*c* may not require user action at the receiving vehicle 1*b*, whereby the charge request 101*b* is automatically received and accepted by the PCU of the receiving vehicle 1*b*.

At step 103, in response to the charge request input 101*a* from the user, the PCU 6*a* of the source vehicle 1*a* instructs the DC-DC converter 3*a* of the source vehicle 1*a* to transition to a power output mode or "Buck Mode". At step 104, once the charge request 101*b* is accepted by the receiving vehicle 1*a*, either manually or automatically, the PCU 6*b* of the receiving vehicle 1*b* instructs the DC-DC converter 3*b* of the receiving vehicle 1*b* to transition to an power input mode or "Boost Mode."

At step 105 the user of the source vehicle 1*a* may provide power delivery control inputs 105*a* via the user interface 21*a*. The PCU 6*a* of the source vehicle 1*a* communicates the power delivery control inputs 105*a* received at the user interface 21*a* to the receiving vehicle 1*a* via the communication lines 18*a*, 18*b* of the cable. In this step, the PCU 6*a* of the source vehicle 1*a* determines a charge power based on a PWM duty cycle level. For example, when the duty cycle is 100%, the PCU 6*a* of the source vehicle 1*a* sets the charge power to a maximum possible value (e.g., 10 kW) and when the duty cycle is 0% PCU 6*a* of the source vehicle 1*a* does not allow charging (i.e., 0 kW). To set the charging power between 0 kW and 10 kW, the source vehicle 1*a* linearly adjusts PWM duty cycle between 0% and 100%.

At step 106, the PCU 6*b* of the receiving vehicle 1*b* selects the charge power for the receiving vehicle 1*b* based on the lesser of (i) the maximum power output of the source vehicle 1*a* (set in Step 105) or (ii) the power level required by the receiving vehicle 1*b* (the receiving vehicle uses the minimum of the two values). The receiving vehicle 1*b* then communicates the selected charge power 106*a* to the source vehicle 1*a*. At step 107 and step 108, the DC-DC converters 3*a*, 3*b* of both vehicles 1*a*, 1*b* control the charge power based on the voltage and current control by adjusting PWM duty cycles of their power electronic switches.

Figure 5:
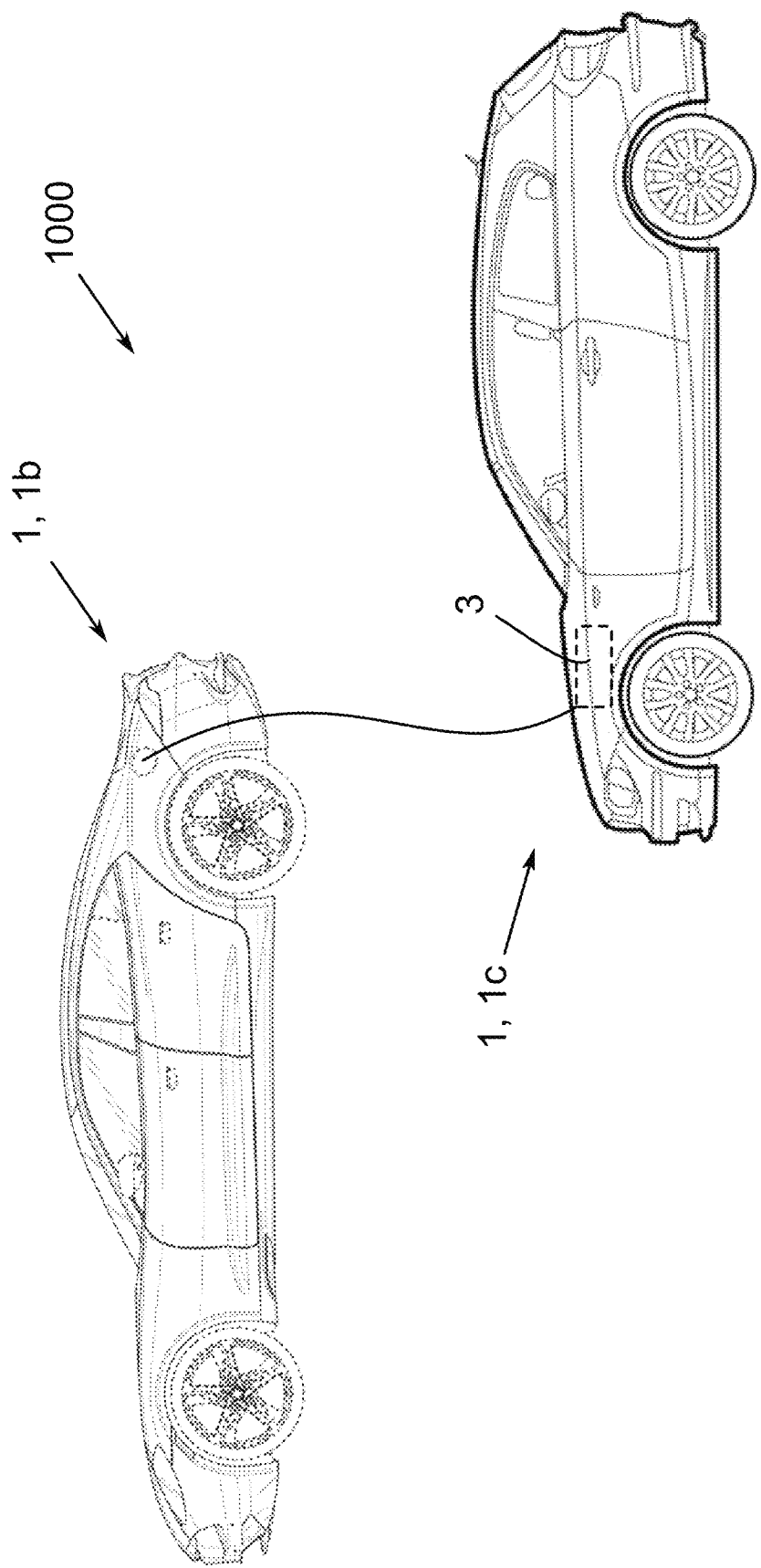
FIG. 5 is an example vehicle to vehicle charging system for an EV and an internal combustion engine (ICE) vehicle.

FIG. 5 illustrates a charging system 1000 between an electric vehicle 1*b* and a typical internal combustion engine (ICE) vehicle 1*c*. The internal combustion engine vehicle 1*c* may include a low-voltage battery 4*c*, typically 12-14 volts, to power electrical accessories of the vehicle 1*c*. The low-voltage battery 4*c* may be charged by an alternator 7 attached to an internal combustion 8 engine of the vehicle 1*c*.

Figure 6:
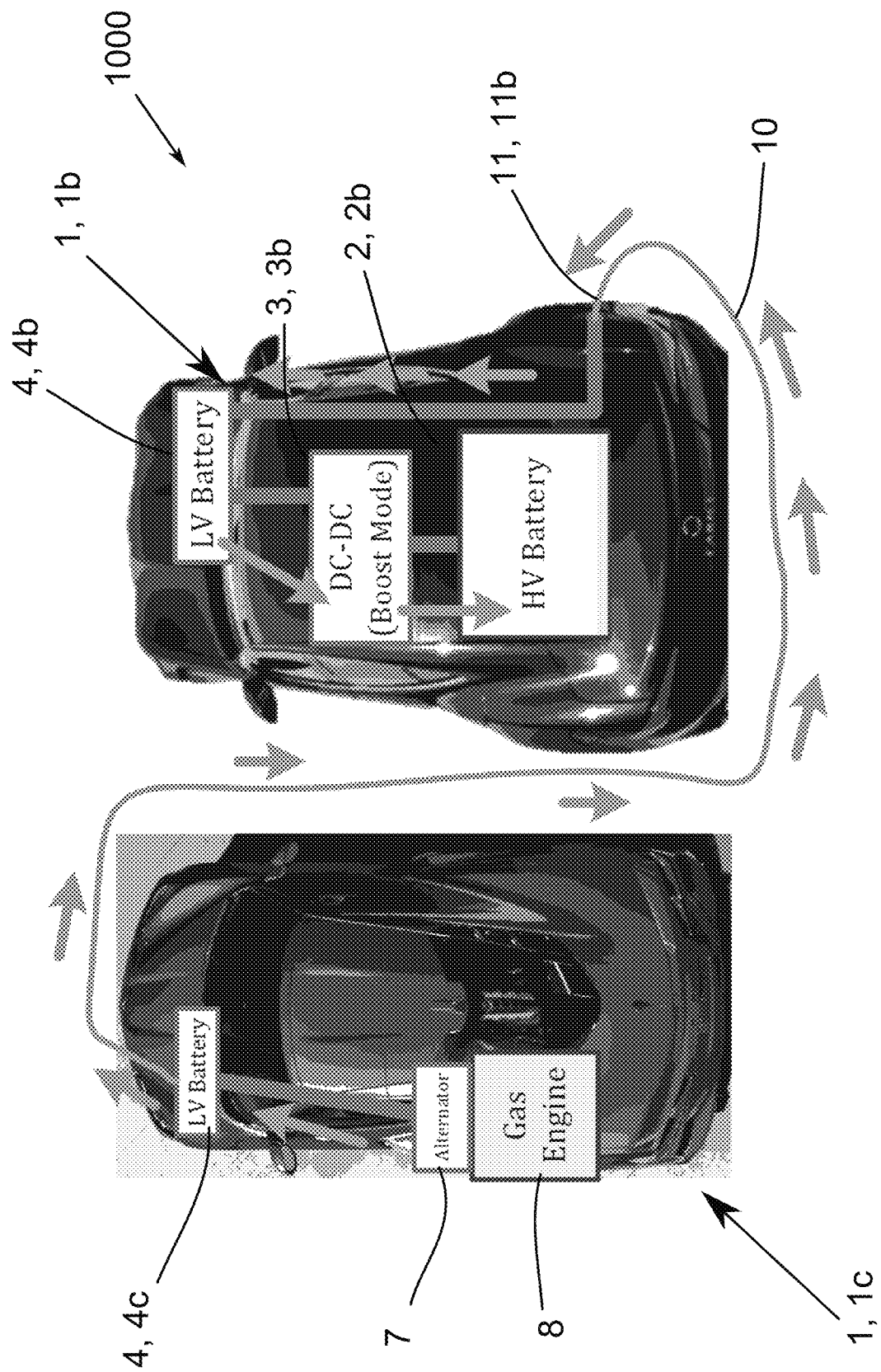
FIG. 6 is a power flow schematic for the charging system shown in FIG. 5.

FIG. 6 is a power flow schematic of the system shown in FIG. 5. The low-voltage battery 4*c* of the ICE vehicle 1*c* receives energy from the alternator 7 mechanically attached to an internal combustion engine 8. The energy-receiving vehicle 1*b* receives energy from the low-voltage battery 4*c* of the ICE vehicle 1*c* via the charging cable 10. The low-voltage battery 4*b* then sends energy to the DC-DC converter 2*b*, which increases the voltage of the energy for charging the high-voltage battery.

Figure 7:
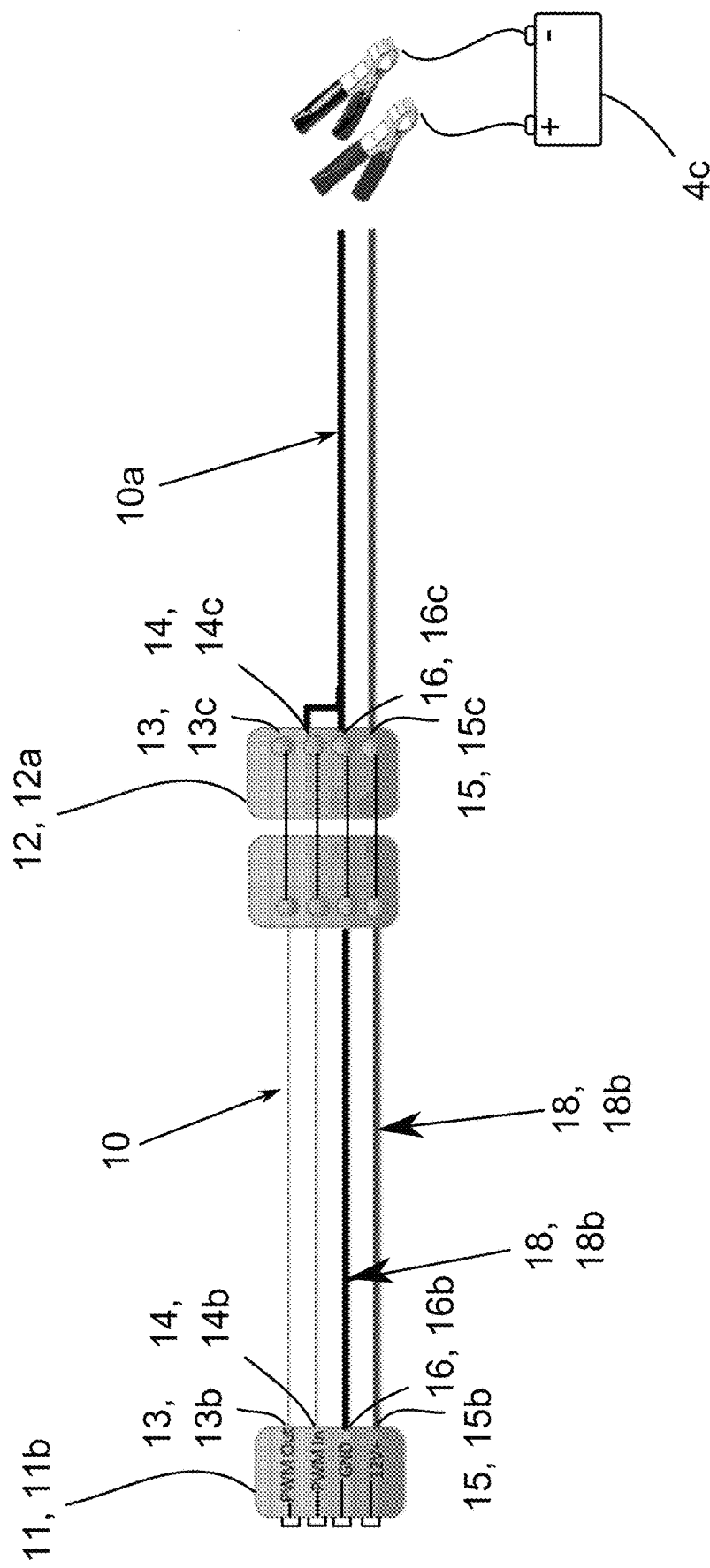
FIG. 7 is a connection schematic of the charging system shown in FIG. 5.

FIG. 7 is a connection schematic of the system shown in FIG. 5. The cable 10 utilized in the EV-to-EV charging system 1000 is connected to an additional ICE vehicle adaptor 10*a* configured to connect to the low-voltage battery 4*c* of the ICE vehicle. The vehicle adaptor 10*a* includes a first connector 12, 12*a* configured to connect to the cable 10. Accordingly, the connector 12*a* may be configure in a similar manner as one of the connection ports 11, including a communications output 13, 13*c*, a communications input 14, 14*c*, a power terminal 15, 15*c*, and a ground terminal 16, 16*c*.

Figure 8:
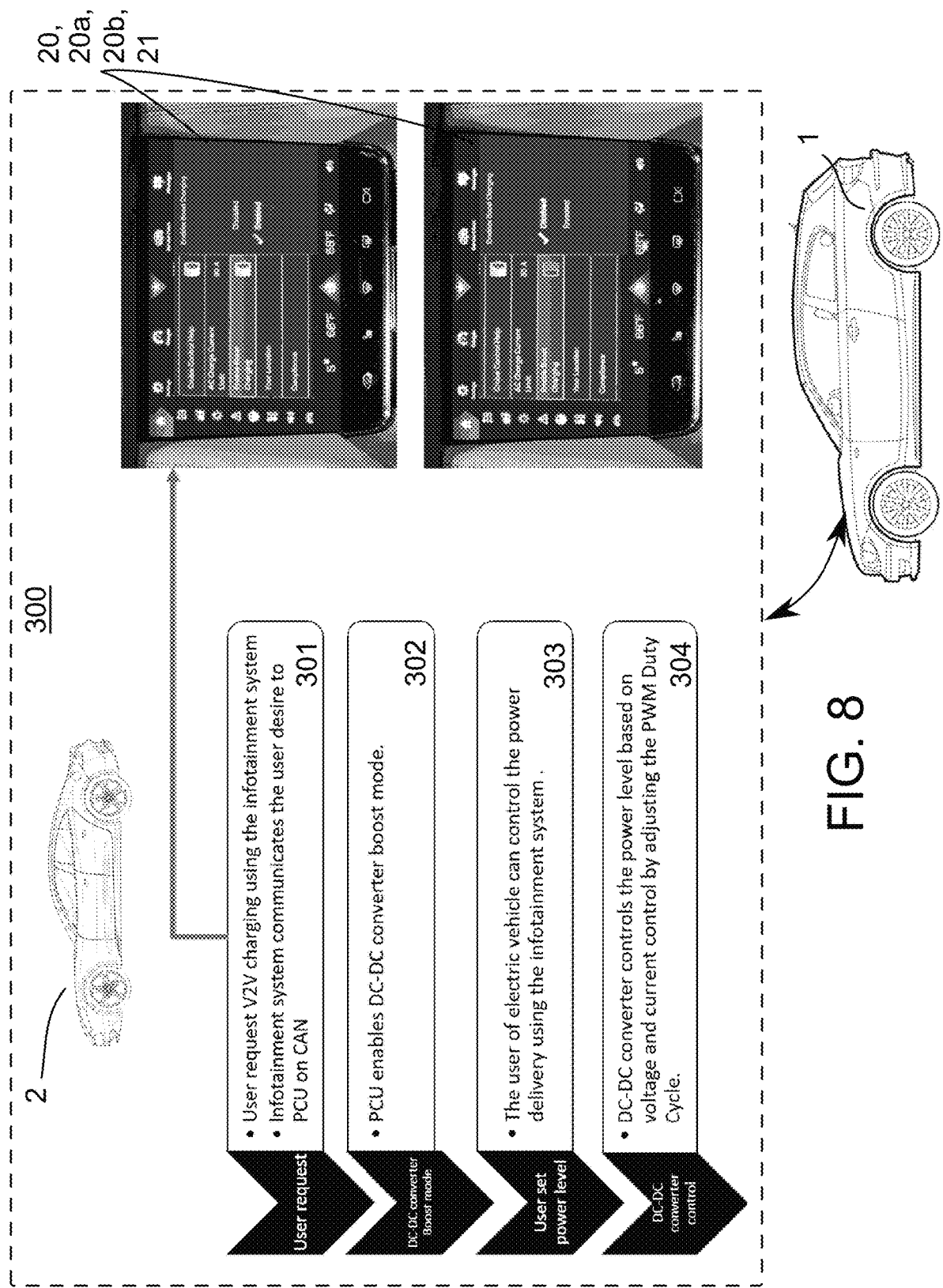
FIG. 8 is a simplified flow chart of the charging system shown in FIG. 5.

FIG. 8 shows a power control scheme 300 that the electric vehicle 1B executes when performing the ICE vehicle 1*c* to electric vehicle 1*b* charging. Unlike power control scheme 100 previously described with respect to two electric vehicles 1*a*, 1*b*, where both vehicles include PCUs 6*a*, 6*b* and control units (user devices) 20, 20*a*, 20*b* for interfacing via corresponding user interfaces 21 presented on a display 22 with and controlling power transfer, the power control scheme 300 of the present example relies on the PCU and control unit 20b of the receiving vehicle 1b, as the ICE vehicle 1c may not be equipped with corresponding system hardware for managing power transfer between vehicles.

At step 301, the system 1000 receives a charge request input 101a from a user of one of the vehicles 1 via the user interface 21 of the user device 20. Upon receipt of the charge request input 101a, the control unit 20b of the receiving vehicle 1b transmits a charge request 101b to the PCU 6b of the receiving vehicle 1b via a CAN-bus of the receiving vehicle 1b.

At step 302 the PCU 6b of the receiving vehicle 1b receives the charge request 101b instructs the DC-DC converter 3b of the receiving vehicle 1b to transition to a power input mode or "Boost Mode." At step 303, the user of the receiving vehicle 1b may control the power delivery via the control unit 20. At step 304, the DC-DC converter 3b of the receiving vehicle 1b controls the power level based on the voltage and current control by adjusting PWM duty cycles of the power electronic switches of the DC-DC converter 3b.

Regarding the charging system 1000, the EV PCU 6b is the supervisory controller for the power control scheme 300. The PCU 6b processes the inputs from the user and feedback signals from the DC-DC converter 3b, and defines set points for DC-DC converter 3b. The PCU 6b connects with the CAN bus of the receiving vehicle 1b to send the set points to DC-DC converter 3b. The user may set the vehicle in a "V2V Charge" mode and may define a power limit (i.e., maximum rate of charge) and also a total energy to be received from the ICE vehicle 1c. If neither of the power limit and the total energy are defined by the user, the PCU 6b may use preset hardware limits. The DC-DC converter 3b uses control algorithms to follow the set points of the PCU 6b. In one implementation the DC-DC converter 6b receives from the PCU (i) a voltage set point for the low voltage battery 4b and (ii) the maximum low-voltage battery current. In another example, DC-DC converter 6b only receives the voltage set point for low-voltage battery 4b from the PCU, while maximum low-voltage battery current for the DC-DC converter 4b is preset based on a voltage limit associated with the DC-DC converter hardware.

Figure 9:
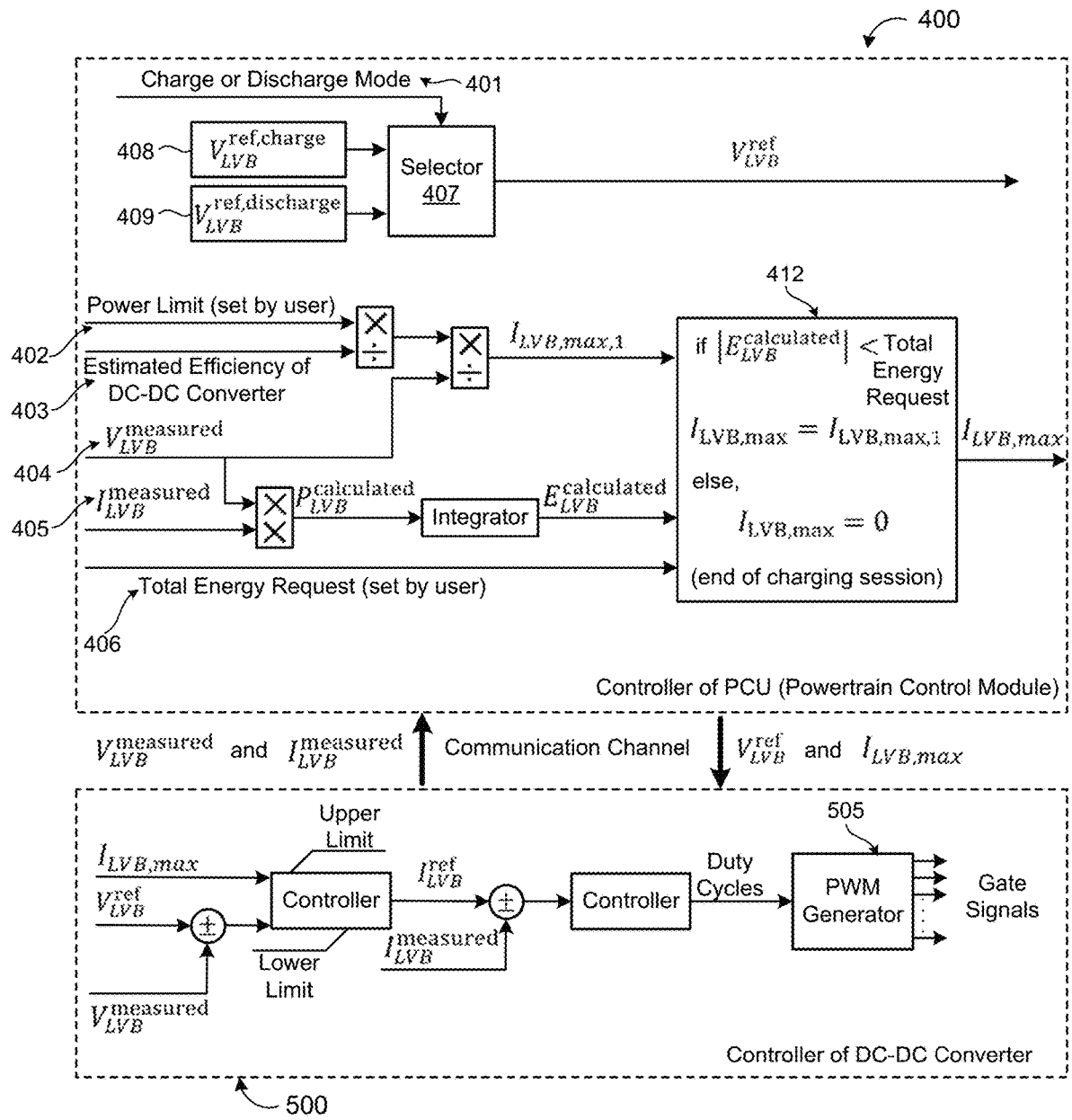
FIG. 9 is a control block diagram of an example EV utilized for charging/discharging.
Figure 10:
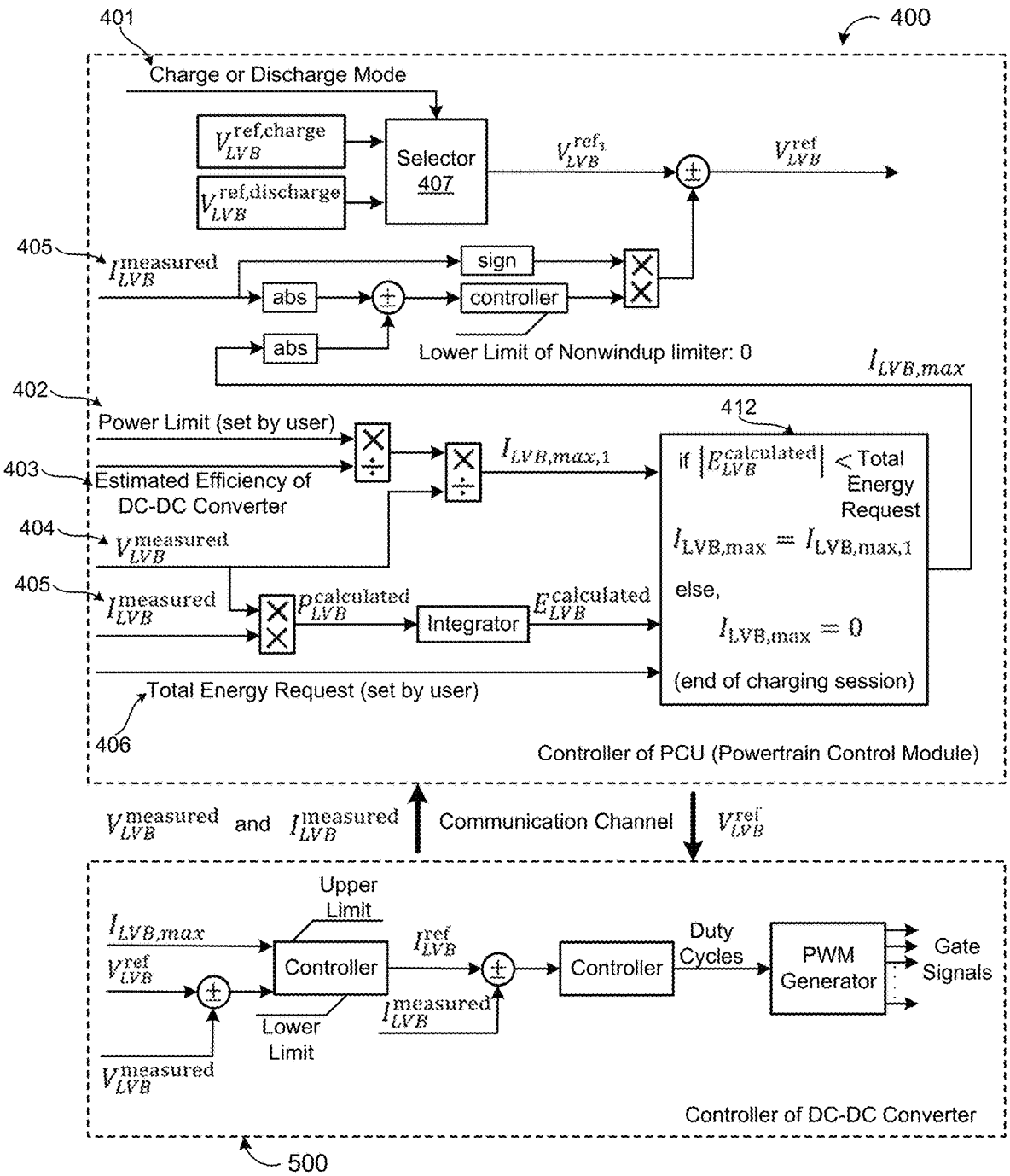
FIG. 10 is a control block diagram of an example EV utilized for charging/discharging.

FIGS. 9 and 10 show control logic block diagrams for the two different variations of the vehicle charging system 1000 for a receiving EV and an ICE source vehicle. FIG. 9 shows wherein the PCU sets the voltage set point for the low-voltage battery and also defines the maximum allowed current for the low-voltage battery. FIG. 10 shows wherein the PCU only sets the voltage set point for the low-voltage battery voltage. In FIG. 10, the PCU indirectly enforces the maximum low-voltage battery current by manipulating the voltage set point of the low-voltage battery voltage.

In FIG. 9 the PCU controller 400 communicates with the DC-DC converter controller 500. The PCU controller 400 may include at least an energy transfer mode input 401 (e.g., charge, discharge) that is set to charge mode, a power transfer limit input 402, DC-DC efficiency input 403, low voltage battery measured voltage ($V_{LVB}^{measured}$) 404, low voltage battery measured current ($I_{LVB}^{measured}$) 405, and total energy request input 406. The measured current and voltage of the low voltage battery is received by the PCU controller 400 and sent from the DC-DC converter 500. A selector 407 includes two reference voltages, a low voltage battery reference charge voltage ($V_{LVB}^{ref,charge}$) 408 and a low voltage battery reference discharge voltage ($V_{LVB}^{ref,discharge}$) 409. The low voltage battery reference charge voltage ($V_{LVB}^{ref,charge}$) 408 and the low voltage battery reference discharge voltage ($V_{LVB}^{ref,discharge}$) 409 are the set point voltages for the DC-DC converter 500 for the selected mode input 401 (i.e., charge or discharge). The PCU controller 400 calculates a maximum current ($I_{low-voltageB,max}$) allowed for the low battery voltage by utilizing the power limit (set by the user or hardware default settings) and the low voltage battery measured voltage ($V_{LVB}^{measured}$) 404. The PCU controller 400 is also configured to monitor the charging session by continuously checking if the calculated current energy calculated ($E_{LVB}^{calculated}$) is less than the total energy requested (set by the user or hardware default settings) through the energy check block 412. The current energy calculated ($E_{LVB}^{calculated}$) is calculated by integrating the power of the low voltage battery ($P_{LVB}^{calculated}$) throughout the charge session. When the absolute value of the current energy calculated ($E_{LVB}^{calculated}$) is less than the total energy requested, the maximum low battery voltage ($I_{low-voltageB,max}$) will be set to a value associated with the power limit set and the low voltage battery measured voltage ($V_{LVB}^{measured}$) 404. When the absolute value of the current energy calculated ($E_{LVB}^{calculated}$) is greater than or equal to the total energy requested, the energy check block will end the charging session by setting the maximum low battery voltage at 0 ($I_{low-voltageB,max}=0$).

The DC-DC converter controller 500 is configured to control the power delivery of the DC-DC converter 3 to/from the low voltage battery 4. The DC-DC converter controller 500 receives the low voltage battery reference voltage ($V_{LVB}^{ref}$) and the maximum low voltage battery current ($I_{low-voltageB,max}$) signals from the PCU controller 400 and sends low voltage battery measured current ($V_{LVB}^{measured}$) and low voltage battery measured current ($I_{LVB}^{measured}$) signals to the PCU controller. The DC-DC converter controller 500 also sends commands (e.g. duty cycles) to a PWM generator 505 depending on the signals received in order to provide the correct voltage and current while satisfying power limits and energy limits set by the user. The power and energy limits may also be set to a default by the manufacturer which is dependent on the hardware limits.

FIG. 10 shows the same process and elements in FIG. 9, however, the PCU controller 400 now only sends the DC-DC converter controller 500 the low voltage battery reference voltage ($V_{LVB}^{ref}$) and not the maximum low voltage battery current ($I_{low-voltageB,max}$). In this example, the PCU controller 400 takes the maximum low voltage battery current ($I_{low-voltageB,max}$) into consideration while choosing the low voltage battery reference voltage ($V_{LVB}^{ref}$). The reference low voltage batter voltage ($V_{LVB}^{ref}$) is chosen such that the low-voltage battery current is always limited to the maximum low voltage battery current ($I_{low-voltageB,max}$).

The advantages of the examples shown in FIG. 9 and FIG. 10 depends on the capability of DC-DC converter controller 500. Not all DC-DC converters are capable of receiving the maximum low voltage battery current ($I_{low-voltageB,max}$) as an input, and, when the vehicle utilizes a DC-DC converter that cannot receive the maximum low voltage battery current ($I_{low-voltageB,max}$) as an input, the only option is to somehow move the current control function to the PCU controller 400 as shown in FIG. 10. When the utilized DC-DC converter 3 in the vehicle 1 is capable of receiving the maximum low voltage battery current ($I_{low-voltageB,max}$) as an input, then the control function shown in FIG. 9 will be utilized.

Figure 11:
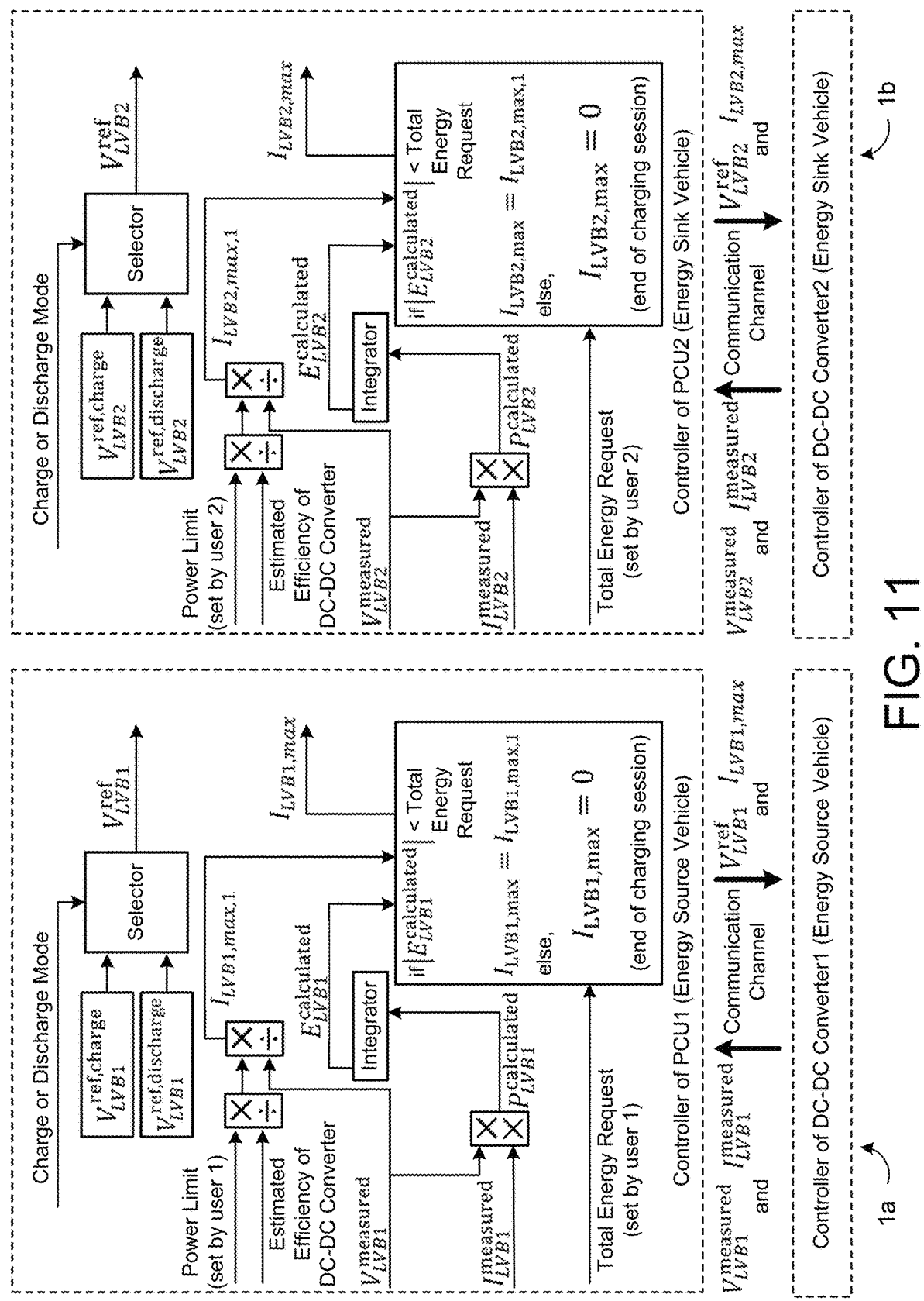
FIG. 11 is a control block diagram of an example charging system.
Figure 12:
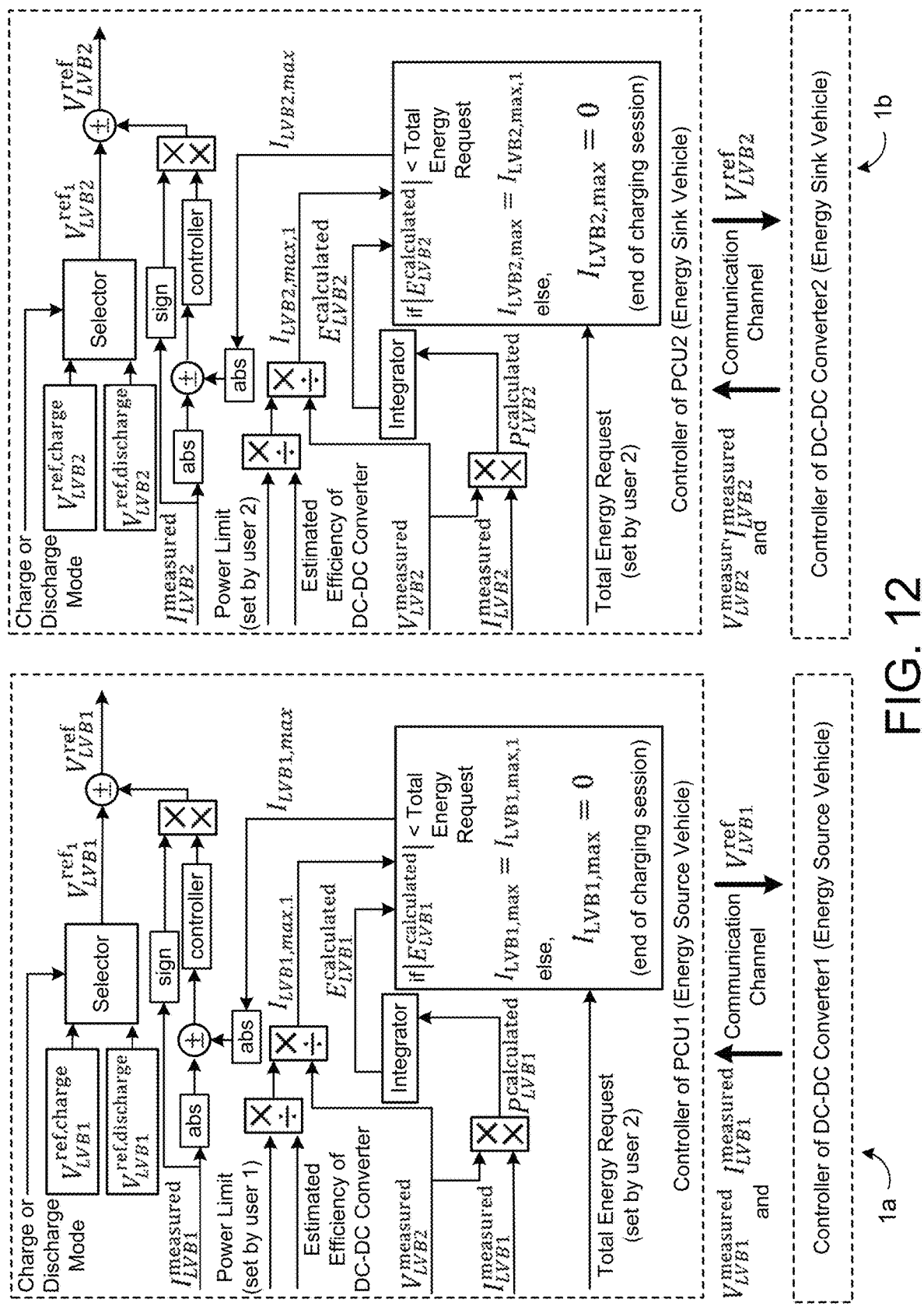
FIG. 12 is a control block diagram of an example charging system.
Figure 13:
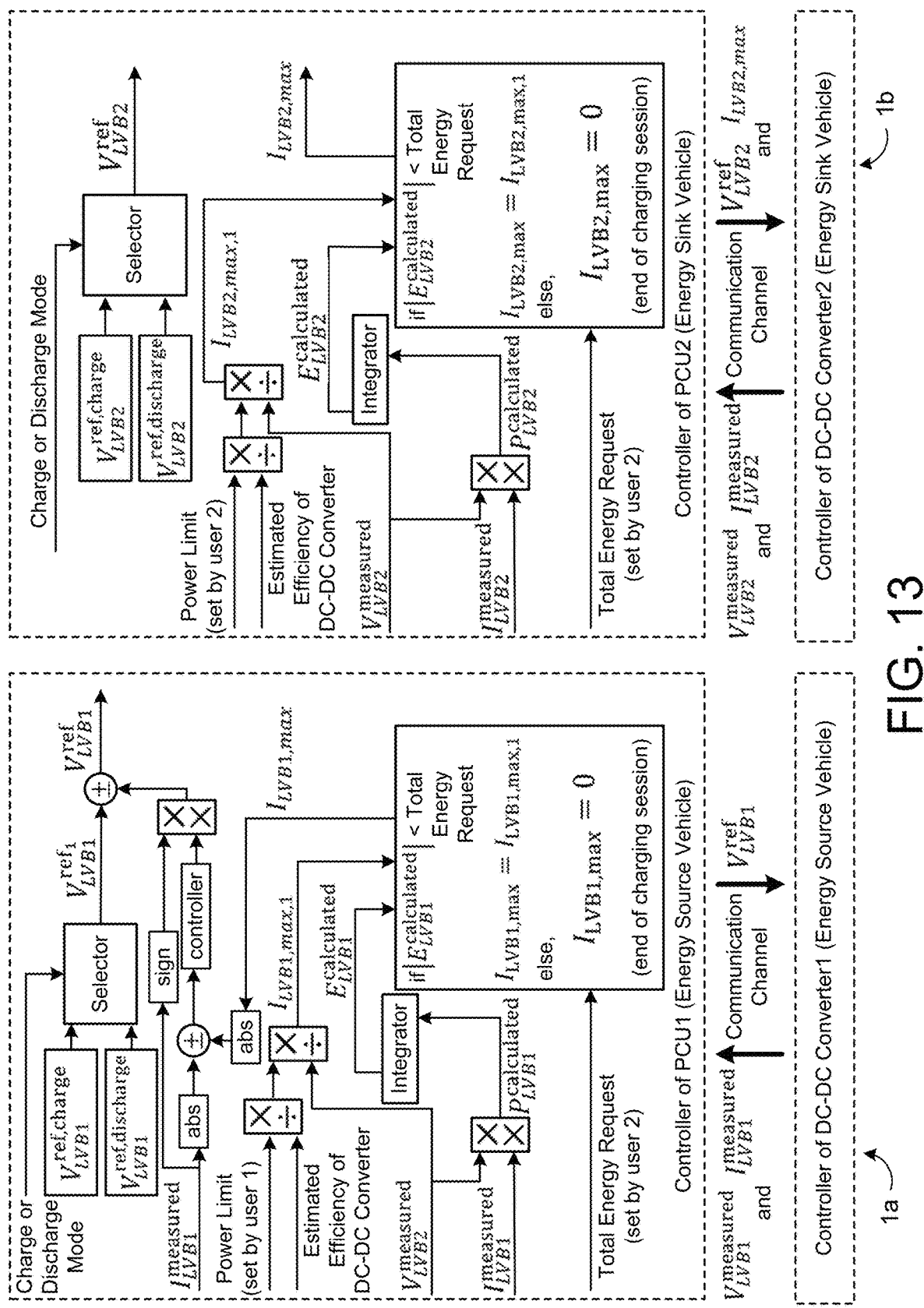
FIG. 13 is a control block diagram of an example charging system.
Figure 14:
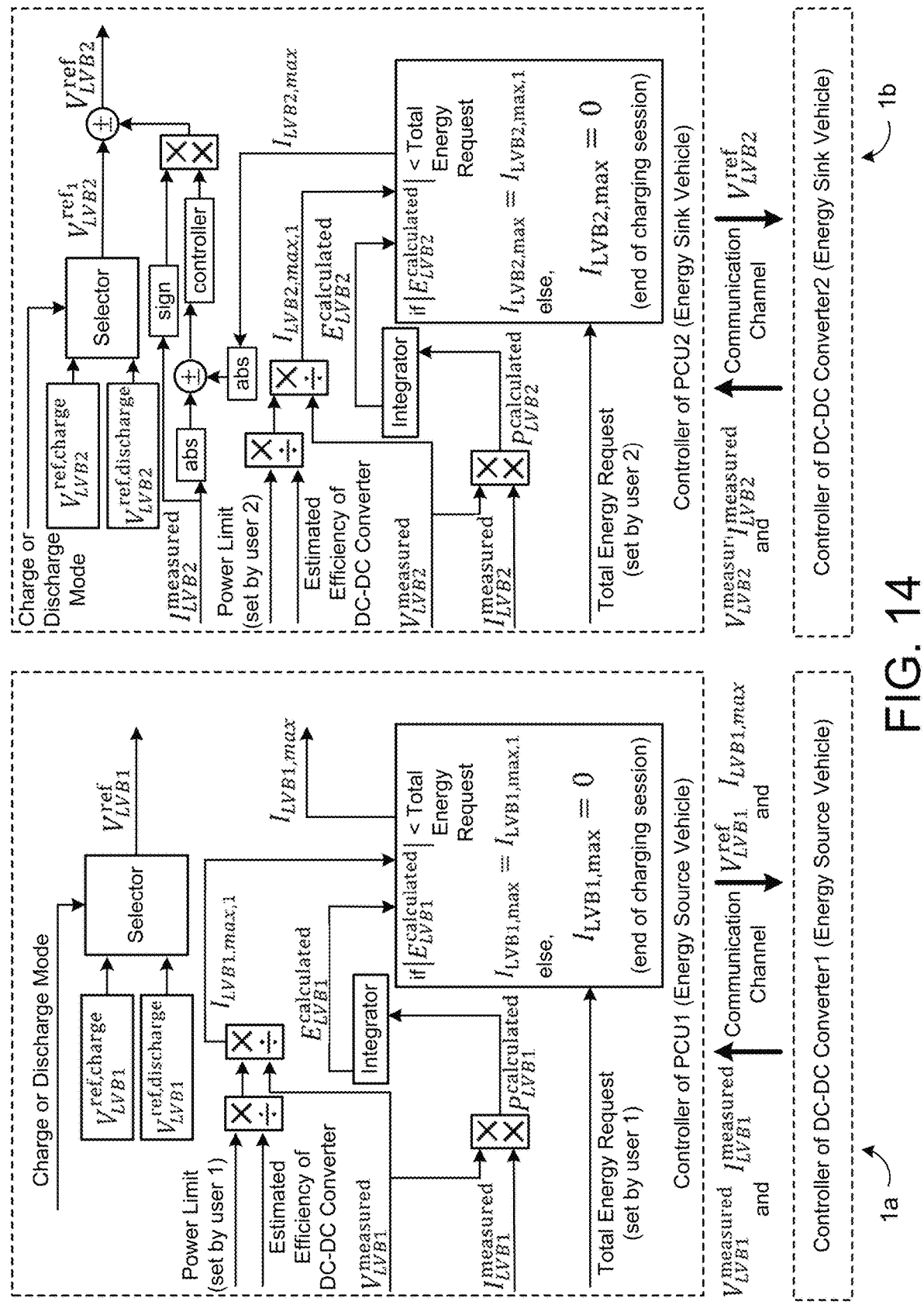
FIG. 14 is a control block diagram of an example charging system.

FIGS. 11-14 shows control logic block diagrams for different variations of the vehicle to vehicle charging for two EVs 1a, 1b with no communication between the vehicles (i.e., utilizing power lines only). FIG. 11 is a configuration wherein the PCUs 6a, 6b of both vehicles 1a, 1b set the maximum low voltage battery current ($I_{low-voltageB1,max}$, $I_{low-voltageB2,max}$), and the target low battery voltage ($V_{low-voltageB1}$, $V_{low-voltageB2}$). FIG. 12 is a configuration wherein the PCU of both vehicles only set the target low battery voltage ($V_{low-voltageB1}$,$V_{low-voltageB2}$). FIG. 13 is a configuration wherein the PCU 6a of the source vehicle 1a only sets the target low battery voltage ($V_{low-voltageB1}$) and the PCU 6b for the receiving vehicle 1b sets the target low battery voltage ($V_{low-voltageB2}$) and also sets the maximum low voltage battery current ($I_{low-voltageB2,max}$). FIG. 14 is a configuration wherein the PCU 6b of the receiving vehicle 1b only sets the target low battery voltage ($V_{low-voltageB2}$) while the PCU 6a for the source vehicle 1a sets the target low battery voltage ($V_{low-voltageB1}$) and also sets the maximum low voltage battery current ($I_{low-voltageB1,max}$). Elements shown in FIGS. 11-14 are the same as in FIGS. 9 and 10 but show different permutations of EV-to-EV charging with the source vehicle 1a and receiving vehicle 1b.

For FIGS. 11-14, charging can take place without any communication between the two vehicles 1a, 1b. In this implementation, the low voltage batteries 4a, 4b of the two vehicles 1a, 1b function as energy buffers. Thus any difference in power requests/limits will be protected by the low voltage batteries 4a, 4b. A user of the source vehicle 1a may put the vehicle 1a in "V2V Discharge" mode and manually defines the power limit and the total energy. Conversely, a user of the receiving vehicle 1b may put the vehicle in "V2V Charge" mode and manually define the power limit and the total energy. The power limit and total energy are limited to the minimum of the corresponding values set by the two users.

Figure 15A:
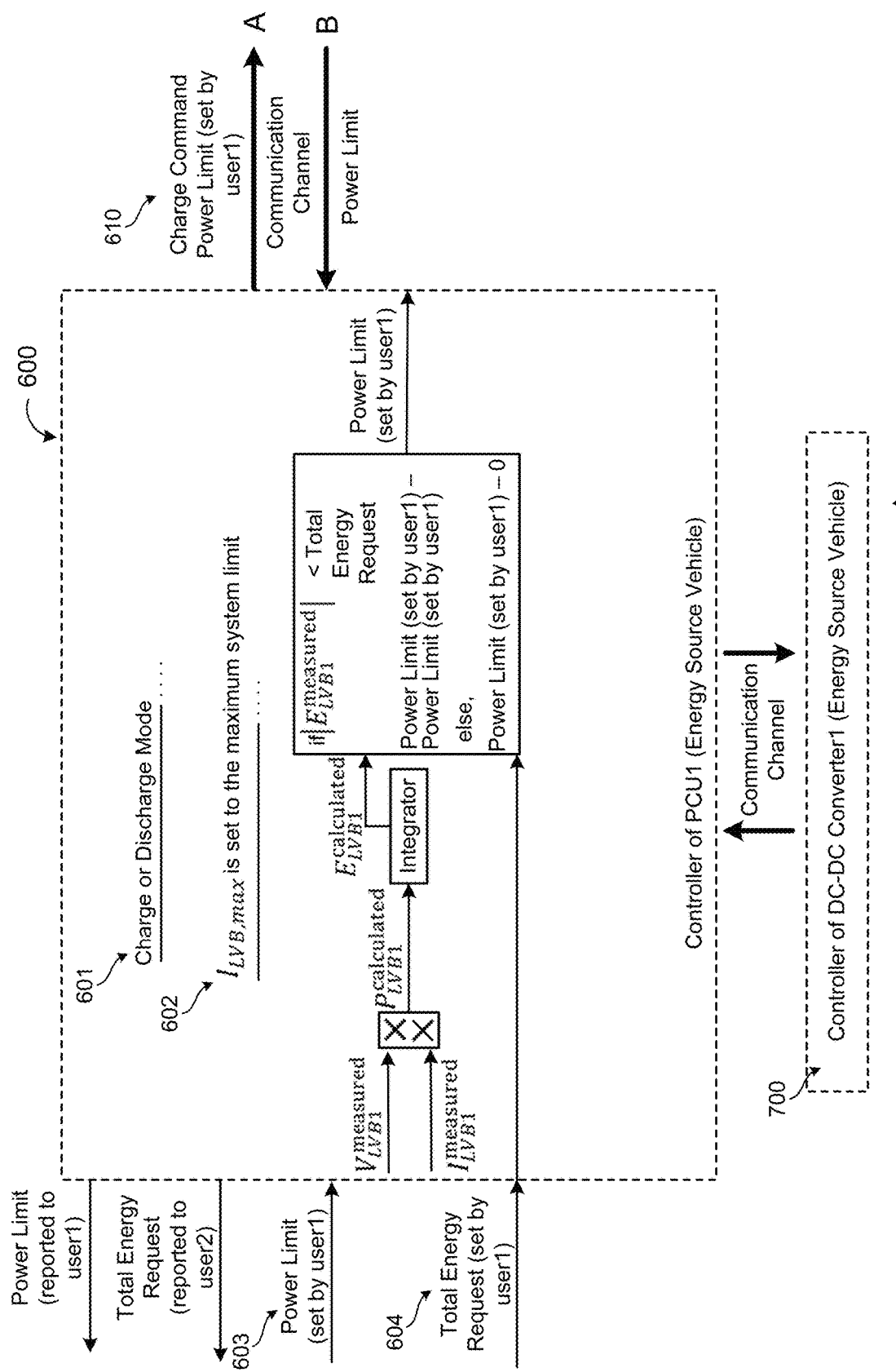
FIG. 15A is the first part of a control block diagram of an example charging system.
Figure 15B:
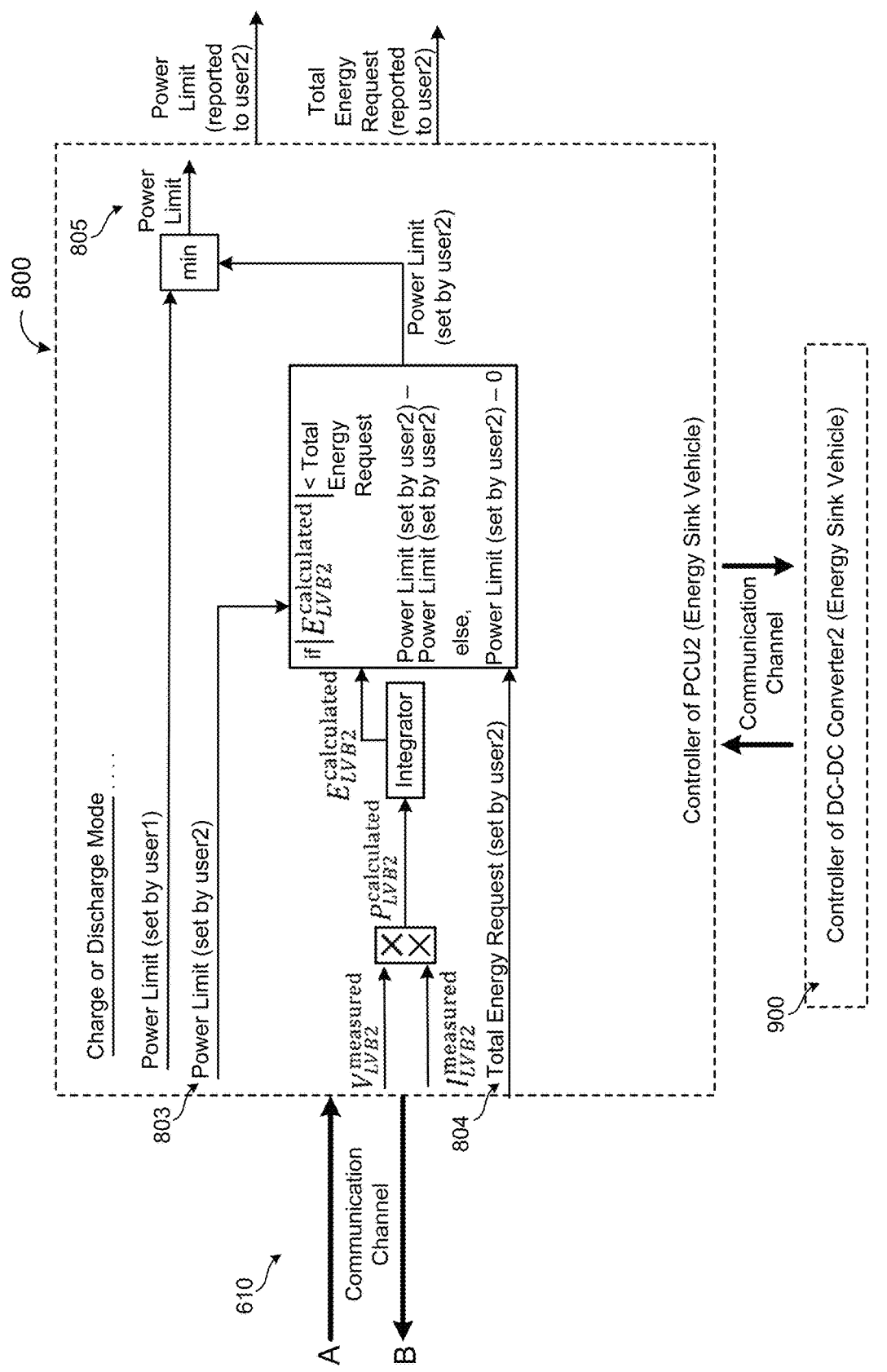
FIG. 15B is the second part of the control block diagram of an example charging system shown in FIG. 15A.
Figure 16:
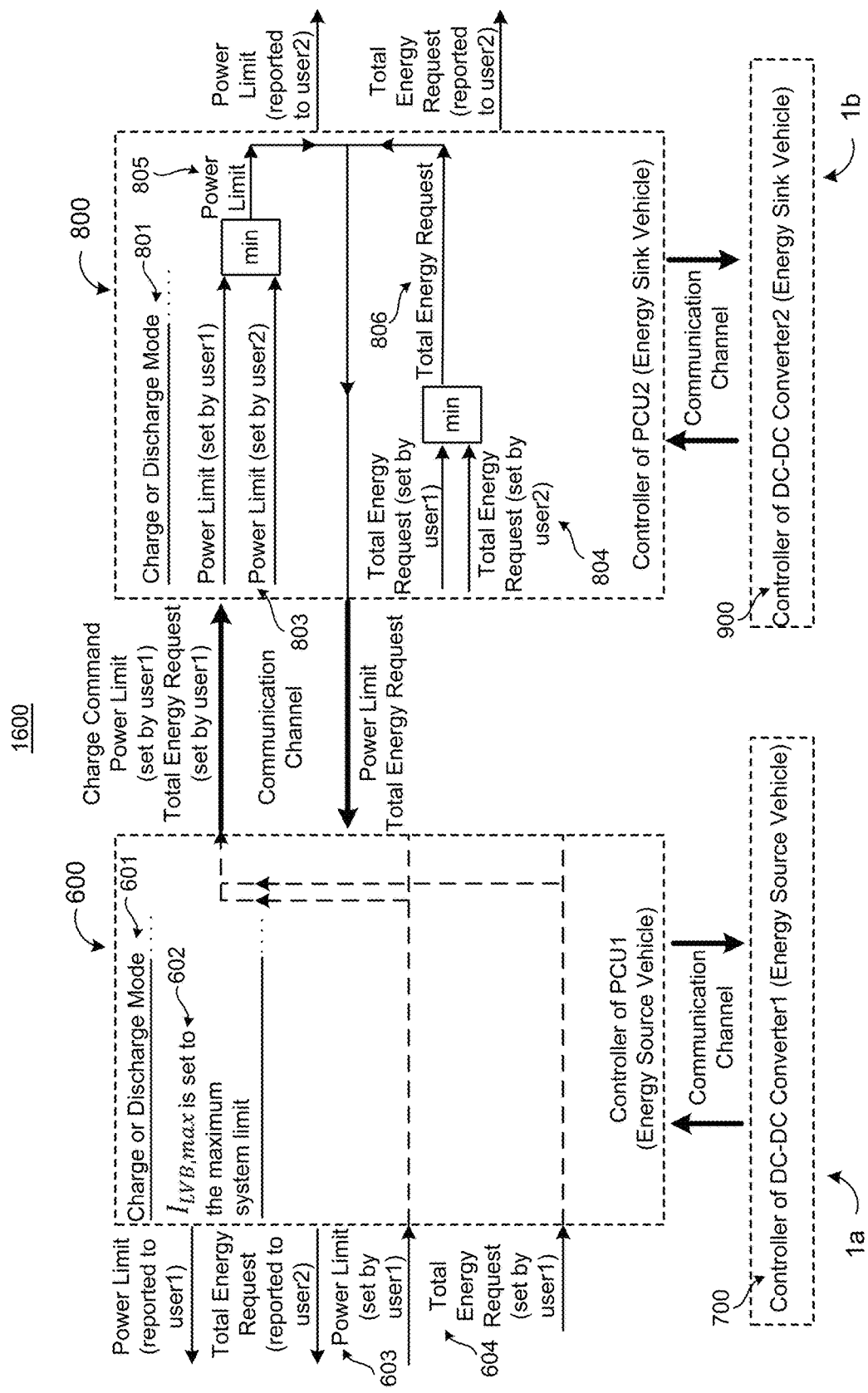
FIG. 16 is a control block diagram of an example charging system.

FIGS. 15A, 15B and 16 show the block diagram for EV-to-EV charging with communication between the vehicles via a communication channel 610. Particularly, FIG. 15A shows a PCU controller 600 of a first vehicle 1a in communication with the DC-DC converter controller 700 of the first vehicle 1a and FIG. 15B shows a PCU controller 800 of a second vehicle 1b in communication with the DC-DC converter controller 800 of the second vehicle 1b. In this example, PWM signals are utilized for communication purpose (FIG. 15A, FIG. 15B). However, this communication channel may be done via Bluetooth©, wireless internet, or any other wireless waveguided manner (FIG. 16). The energy source vehicle 1a includes a charge or discharge mode input 601, a maximum low voltage battery current ($I_{LVB,max}$) input 602, a power limit input 603, a total energy request input 604. The maximum low voltage battery current ($I_{LVB,max}$) may be set to maximum hardware limits As shown in FIGS. 15A and 15B, example steps for charging via PWM communication are as follows. A user of the source vehicle 1a (User 1) may put the vehicle in "V2V Discharge" mode and defines the power limit and the total energy with inputs 601, 603, and 604 respectively. The source vehicle 1a sets its battery current limit, power limit, and the total energy based on maximum hardware limits for the source vehicle 1a via the source vehicle PCU 6a. An energy transfer mode input indicating "V2V Discharge" mode is sent to the receiving vehicle 1b by the source vehicle 1a via a "high" PWM signal (i.e., 100% duty cycle) for a pre-defined period of time. Once the receiving vehicle 1b determines that the source vehicle 1a is in "V2V Discharge" mode, the receiving vehicle 1b transitions to "V2V Charge" mode. The source vehicle 1a also continuously sends the power limit set by the user to the receiving vehicle 1a via the communication channel 610 (FIGS. 15A and 15B linked by "A" and "B" communication signals). To do so, the source vehicle 1a evaluates the total energy request 604. The PCU 6a of the source vehicle 1a measures the energy during the charge session and compares it with the value of total energy request 604 set by the user. Once the value of the measured energy reaches the value of the total energy request 604 set by User 1, the PCU 6a of the source vehicle 1a the power limit at "0" and transmits the power limit to the receiving vehicle 1b. The user of receiving vehicle (User 2) may also define the values of power limit and the value total energy request via inputs 803 and 804 respectively. To use the power limit, the receiving vehicle 1b also evaluates the value of the total energy request 804. The PCU 6b of the receiving vehicle 1b measures the energy during the charge session and compares it with the value of the total energy request 804. Once the value of the transferred energy reaches the value total energy request 804 set by User 2, the PCU 6b of the receiving vehicle 1b considers "0" as the power limit. The receiving vehicle 1b selects the smaller of the values of the power limits set by the two vehicles 1a, 1b as its power limit and sends the power limit signal to the source vehicle 1a via outputs 805 through the communication channel 610. Thus, if the source vehicle 1a sets a lower power limit than the source vehicle 1b, the charging system will utilize the power limit set by vehicle 1a, and if the source vehicle 1b sets a lower power limit than source vehicle 1a then the charging system will utilize the power limit set by the source vehicle 1b. Since both vehicles 1a, 1b use the mechanism to use "0" as the power limit once the energy reaches the total energy defined by their user, charging automatically stops once the energy reaches the minimum of the total energy defined by User 1 or User 2. Power and energy limits are set to not exceed the hardware limitations. Each of the two vehicles 1a, 1b may be configured to operate wherein their PCU 6a, 6b sets the maximum low voltage battery current ($I_{low-voltageB,max}$) and the target low battery voltage ($V_{low-voltageB}$) or wherein their PCU 6a, 6b only sets the target low battery voltage ($V_{low-voltageB}$).

As shown in FIG. 16, an example method 1600 for charging via advanced communication are as follows. The method may execute on data processing hardware 6 of the source vehicle 1a, the receiving vehicle 1b or a combination of the data processing hardware (PCU) 6 of the source and receiving vehicles 1a, 1b. The data processing hardware 6 may execute instructions stored on memory hardware 1720 (FIG. 17) of the vehicle to cause the data processing hardware 6 to perform operations for the method 1600. A user of the source vehicle 1a (User 1) may put the vehicle in "V2V Discharge" mode and defines the power limit and the total energy with inputs 601, 603, and 604 respectively. These settings are sent to the receiving vehicle 1b via the communication channel 610. The source vehicle 1a sets its battery current limit, power limit, and the total energy to the maximum hardware limits via the source vehicle PCU 6a. Once the receiving vehicle 1b sees that source vehicle 1a is in "V2V Discharge" mode, the receiving vehicle 1b transitions to "V2V Charge" mode via input 801. A user of the receiving vehicle 1b (User 2) may also define the power limit and the total energy via inputs 803 and 804 respectively. The receiving vehicle 1b selects the lesser of the power limits and energy limits set by the two users of the two vehicles 1a, 1b as its power limit and sends the signals to the source vehicle 1a via outputs 805, 806 through the communication channel 610. Thus, if User 1 sets a lower power and/or energy limit than User 2 then the charging system will utilize settings of User 1, and if User 2 sets a lower power and/or energy limit than User 1 then the charging system will utilize settings of User 2. Power and energy limits cannot exceed the hardware limitations and are limited in the control unit 20. Actual values utilized by the vehicles 1a, 1b are sent to both the receiving vehicle 1b and source vehicle 1a via the communication channel 610. Each of the two vehicles 1a, 1b may be configured to operate wherein the PCUs 6a, 6b of both vehicles 1a, 1b set the maximum low voltage battery current ($I_{low\text{-}voltageB,max}$) and the target low battery voltage ($V_{low\text{-}voltageB}$) or wherein their PCUs 6a, 6b only set the target low battery voltage ($V_{low\text{-}voltageB}$).

Figure 17:
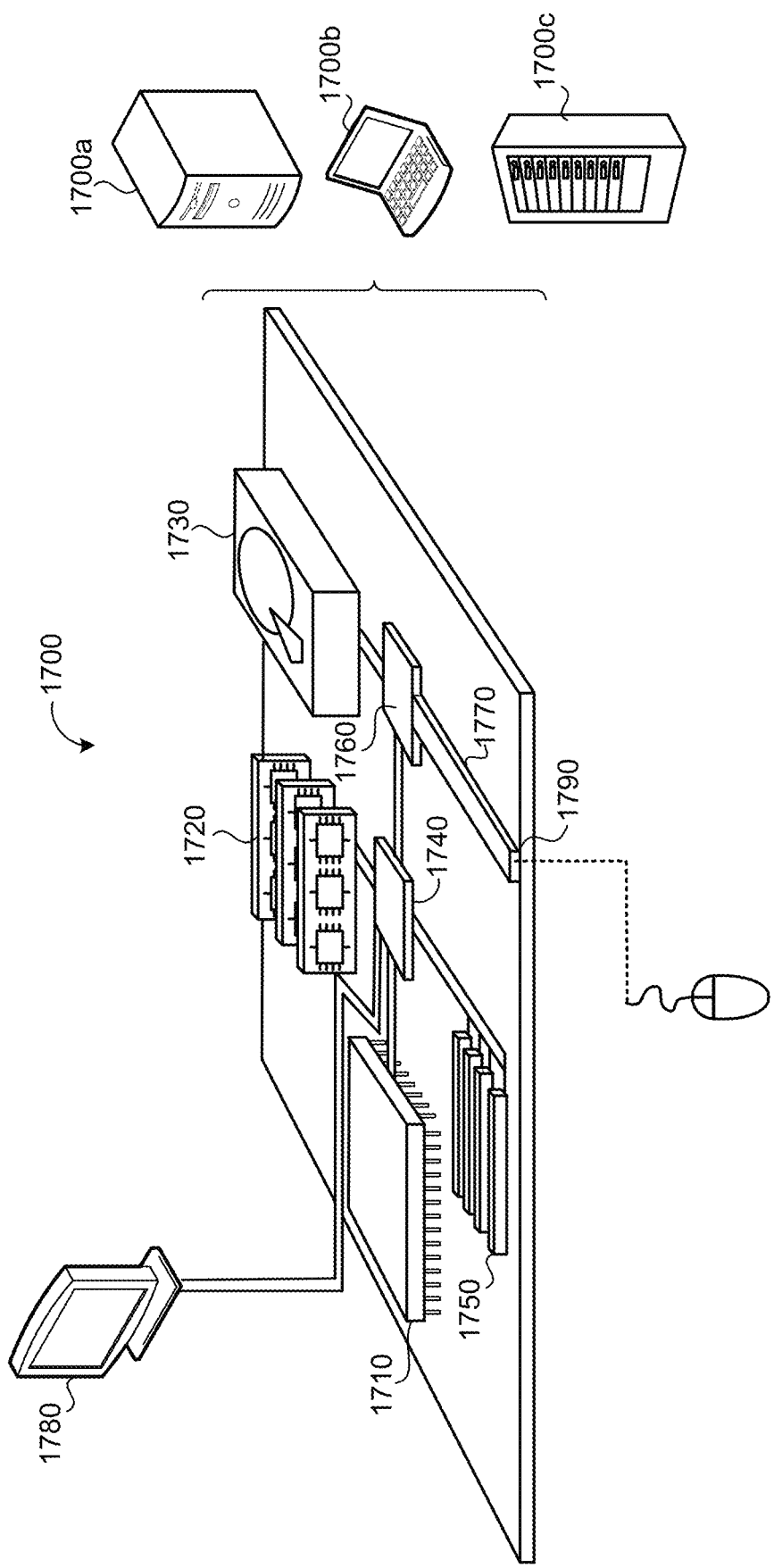
FIG. 17 is schematic view of an example computing device 1700 that may be used to implement the systems and methods described in this document.

FIG. 17 is schematic view of an example computing device 1700 that may be used to implement the systems and methods described in this document. The computing device 1700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1700 includes a processor 1710, memory 1720, a storage device 1730, a high-speed interface/controller 1740 connecting to the memory 1720 and high-speed expansion ports 1750, and a low speed interface/controller 560 connecting to a low speed bus 1770 and a storage device 1730. Each of the components 1710, 1720, 1730, 1740, 1750, and 1760, are interconnected using various busses, and may be mounted on a common motherboard or in other manners as appropriate.

The processor (e.g., data processing hardware) 1710 can process instructions for execution within the computing device 1700, including instructions stored in the memory 1720 or on the storage device 1730 to display graphical information for a graphical user interface (GUI) (e.g., user interface 21) on an external input/output device, such as display 1780 (e.g., display 22) coupled to high speed interface 1740. The processor 1710 may correspond to the PCU(s) 6 of the vehicle to vehicle charging system 1000. In other implementations, multiple processors and/or multiple buses may be used, as appropriate, along with multiple memories and types of memory. Also, multiple computing devices 1700 may be connected, with each device providing portions of the necessary operations (e.g., as a server bank, a group of blade servers, or a multi-processor system).

The memory 1720 stores information non-transitorily within the computing device 1700. The memory 1720 may be a computer-readable medium, a volatile memory unit(s), or non-volatile memory unit(s). The non-transitory memory 1720 may be physical devices used to store programs (e.g., sequences of instructions) or data (e.g., program state information) on a temporary or permanent basis for use by the computing device 1700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1730 is capable of providing mass storage for the computing device 1700. In some implementations, the storage device 1730 is a computer-readable medium. In various different implementations, the storage device 1730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1720, the storage device 1730, or memory on processor 1710.

The high speed controller 1740 manages bandwidth-intensive operations for the computing device 1700, while the low speed controller 1760 manages lower bandwidth-intensive operations. Such allocation of duties is exemplary only. In some implementations, the high-speed controller 1740 is coupled to the memory 1720, the display 1780 (e.g., through a graphics processor or accelerator), and to the high-speed expansion ports 1750, which may accept various expansion cards (not shown). In some implementations, the low-speed controller 1760 is coupled to the storage device 1730 and a low-speed expansion port 1790. The low-speed expansion port 1790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1700 may be implemented in a number of different forms, as shown in the figure. For example, it may be implemented as a standard server 1700a or multiple times in a group of such servers 1700a, as a laptop computer 1700b, or as part of a rack server system 1700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

In sum a vehicle system is provided in order to increase vehicle range in emergency situations by utilizing vehicle to vehicle battery charging.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other examples and that such variations are intended to be encompassed by the present disclosure.

It is important to note that the vehicle network system as shown in the various examples is illustrative only. Although only a few examples have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative examples. Other substitutions, modifications, changes and omissions may also be made in the design, operating conditions and arrangement of the various examples without departing from the scope of the present disclosure.

What is claimed is:

1. A computer-implemented method that, when executed by data processing hardware of a first vehicle in electrical communication with a second vehicle via an electrical connection, causes the data processing hardware to perform operations comprising:
   receiving an energy transfer mode input identifying a selected energy transfer mode for the first vehicle;
   receiving a total energy request input identifying a value of total requested energy associated with the selected energy transfer mode for the first vehicle;
   receiving a first power transfer limit input including a first power transfer limit value representing a first maximum rate of charge associated with the selected energy transfer mode for the first vehicle;
   receiving a second power transfer limit input including a second transfer limit value representing a second maximum rate of charge associated with the selected energy transfer mode for the first vehicle;
   selecting a power transfer limit from the lesser of the first power transfer limit value and the second power transfer limit value; and
   initiating a power transfer between the first vehicle and the second vehicle at the selected power transfer limit.

2. The method of claim 1, further comprising:
   measuring a value of total transferred energy between the first vehicle and the second vehicle; and
   when the value of total transferred energy is equal to or greater than the value of total requested energy, terminating the power transfer between the first vehicle and the second vehicle.

3. The method of claim 1, wherein the selected energy transfer mode is one of a charge mode or a discharge mode.

4. The method of claim 1, wherein the energy transfer mode input is received from a control unit of the first vehicle.

5. The method of claim 1, wherein the energy transfer mode input is received from a control unit of the second vehicle.

6. The method of claim 1, wherein the total energy request input is received from the first vehicle.

7. The method of claim 1, wherein the total energy request input is received from the second vehicle.

8. A system for transferring energy between a first vehicle and a second vehicle in electrical communication with the first vehicle, the system comprising:
- data processing hardware; and
- memory hardware in communication with the data processing hardware, the memory hardware storing instructions that when executed on the data processing hardware cause the data processing hardware to perform operations comprising:
  - receiving an energy transfer mode input identifying a selected energy transfer mode for the first vehicle;
  - receiving a total energy request input identifying a value of total requested energy associated with the selected energy transfer mode for the first vehicle;
  - receiving a first power transfer limit input including a first power transfer limit value representing a first maximum rate of charge associated with the selected energy transfer mode for the first vehicle;
  - receiving a second power transfer limit input including a second transfer limit value representing a second maximum rate of charge associated with the selected energy transfer mode for the first vehicle;
  - selecting a power transfer limit from the lesser of the first power transfer limit value and the second power transfer limit value; and
  - initiating a power transfer between the first vehicle and the second vehicle at the selected power transfer limit.

9. The system of claim 8, further comprising:
- measuring a value of total transferred energy between the first vehicle and the second vehicle; and
- when the value of total transferred energy is equal to or greater than the value of total requested energy, terminating the power transfer between the first vehicle and the second vehicle.

10. The system of claim 8, wherein the selected energy transfer mode is one of a charge mode or a discharge mode.

11. The system of claim 8, wherein the energy transfer mode input is received from a control unit of the first vehicle.

12. The system of claim 8, wherein the energy transfer mode input is received from a control unit of the second vehicle.

13. The system of claim 8, wherein the total energy request input is received from the first vehicle.

14. The system of claim 8, wherein the total energy request input is received from the second vehicle.

15. A control unit for a first vehicle in electrical communication with a second vehicle, the control unit comprising:
- a display;
- data processing hardware in communication with the display; and
- memory hardware in communication with the data processing hardware, the memory hardware storing instructions that when executed on the data processing hardware cause the data processing hardware to perform operations comprising:
  - receiving an energy transfer mode input identifying a selected energy transfer mode for the first vehicle;
  - receiving a total energy request input identifying a value of total requested energy associated with the selected energy transfer mode for the first vehicle;
  - receiving a first power transfer limit input including a first power transfer limit value representing a first maximum rate of charge associated with the selected energy transfer mode for the first vehicle;
  - receiving a second power transfer limit input including a second transfer limit value representing a second maximum rate of charge associated with the selected energy transfer mode for the first vehicle;
  - selecting a power transfer limit from the lesser of the first power transfer limit value and the second power transfer limit value; and
  - initiating a power transfer between the first vehicle and the second vehicle at the selected power transfer limit.

16. The control unit of claim 15, further comprising:
- measuring a value of total transferred energy between the first vehicle and the second vehicle; and
- when the value of total transferred energy is equal to or greater than the value of total requested energy, terminating the power transfer between the first vehicle and the second vehicle.

17. The control unit of claim 15, wherein the selected energy transfer mode is one of a charge mode or a discharge mode.

18. The control unit of claim 15, wherein the energy transfer mode input is received from a control unit of the first vehicle.

19. The control unit of claim 15, wherein the energy transfer mode input is received from a control unit of the second vehicle.

20. The control unit of claim 15, wherein the total energy request input is received from the first vehicle.

21. The method of claim 1, wherein initiating the power transfer between the first vehicle and the second vehicle at the selected power transfer limit comprises:
- initiating, using a first DC-to-DC converter at the first vehicle, a first flow of energy from a first energy source at the first vehicle to a second energy source at the first vehicle, wherein the first energy source operates at a first voltage and the second energy source operates at a different lower second voltage;
- initiating a second flow of energy from the second energy source to a third energy source at the second vehicle; and
- initiating, using a second DC-to-DC converter at the second vehicle, a third flow of energy from the third energy source to a fourth energy source at the second vehicle, wherein the third energy source operates at a third voltage and the fourth energy source operates at a different higher fourth voltage.

22. The system of claim 8, further comprising:
- a first DC-to-DC converter at the first vehicle configured to convert first energy at a first energy source at the first vehicle to second energy at a second energy source at the first vehicle, wherein the first energy source operates at a first voltage and the second energy source operates at a different lower second voltage; and
- a second DC-to-DC converter at the second vehicle configured to convert third energy at a third energy source at the second vehicle to fourth energy at a fourth energy source at the second vehicle, wherein the third energy source operates at a third voltage and the fourth energy source operates at a different higher fourth voltage;

wherein initiating the power transfer between the first vehicle and the second vehicle at the selected power transfer limit comprises initiating a power transfer between the second energy source and the third energy source.

23. The control unit of claim 15, wherein initiating the power transfer between the first vehicle and the second vehicle at the selected power transfer limit comprises:

initiating, using a first DC-to-DC converter at the first vehicle, a first flow of energy from a first energy source at the first vehicle to a second energy source at the first vehicle, wherein the first energy source operates at a first voltage and the second energy source operates at a different lower second voltage;

initiating a second flow of energy from the second energy source to a third energy source at the second vehicle; and initiating, using a second DC-to-DC converter at the second vehicle, a third flow of energy from the third energy source to a fourth energy source at the second vehicle, wherein the third energy source operates at a third voltage and the fourth energy source operates at a different higher fourth voltage.

* * * * *